(12) United States Patent
Shattil et al.

(10) Patent No.: US 10,051,475 B2
(45) Date of Patent: Aug. 14, 2018

(54) UNMANNED AERIAL VEHICLE INTRUSION DETECTION AND COUNTERMEASURES

(71) Applicant: Department 13, LLC, Columbia, MD (US)

(72) Inventors: Steve Shattil, Cheyenne, WY (US); Robi Sen, McLean, VA (US)

(73) Assignee: Department 13, Inc., Columbia, MD (US)

( * ) Notice: Subject to any disclaimer, the term of this patent is extended or adjusted under 35 U.S.C. 154(b) by 55 days.

(21) Appl. No.: 15/279,425

(22) Filed: Sep. 28, 2016

(65) Prior Publication Data

US 2017/0094527 A1    Mar. 30, 2017

Related U.S. Application Data

(60) Provisional application No. 62/233,982, filed on Sep. 28, 2015.

(51) Int. Cl.
*H04J 3/24* (2006.01)
*H04W 12/12* (2009.01)
(Continued)

(52) U.S. Cl.
CPC ......... *H04W 12/12* (2013.01); *H04L 27/0012* (2013.01); *H04L 27/265* (2013.01);
(Continued)

(58) Field of Classification Search
CPC ....... H04W 80/04; H04W 8/26; H04W 88/18; H04W 84/12; H04W 84/18; H04W 88/08; H04W 88/06; H04L 2012/5608
(Continued)

(56) References Cited

U.S. PATENT DOCUMENTS 7,430,257 B1    9/2008  Shattil
8,254,847 B2    8/2012  Sen
(Continued)

OTHER PUBLICATIONS

Amirhossein Fereidountabar,Gian Carlo Cardarilli, Luca Di Nunzio, Rocco Fazzolari; "UAV Channel Estimation with STBC in MIMO Systems"; The International Conference on Advanced Wireless, Information, and Communication Technologies (AWICT 2015).

(Continued)

*Primary Examiner* — Brenda H Pham
(74) *Attorney, Agent, or Firm* — Steven J Shattil

(57) ABSTRACT

A system detects unmanned aerial vehicles (UAVs) and deploys electronic countermeasures against one or more UAVs that are determined to be a threat. A signal detector detects radio signals communicated between a remote control unit and UAV. A feature extractor extracts signal features from the detected radio signals, and a classifier processes the detected radio signals based on its signal features and determines whether the detected radio signals correspond to a known or unknown radio protocol. A threat analyzer determines if a detected UAV is a threat based on at least one of remote-sensing data and classification(s) of the detected radio signals. When a UAV system employs an unknown radio protocol, a mitigation engine synthesizes an exploit based on corresponding extracted signal features. A response analyzer detects a response from the UAV system when an exploit is activated and may adapt the exploit based on the response. In some cases, the exploits can be configured against a UAV in autopilot mode.

22 Claims, 6 Drawing Sheets

(51) Int. Cl.
*H04L 27/00* (2006.01)
*H04L 27/26* (2006.01)
*H04L 12/26* (2006.01)
*H04W 12/06* (2009.01)
*H04L 29/06* (2006.01)
*H04L 29/08* (2006.01)

(52) U.S. Cl.
CPC .......... *H04L 43/18* (2013.01); *H04L 63/1433* (2013.01); *H04W 12/06* (2013.01); *H04L 69/323* (2013.01)

(58) Field of Classification Search
USPC ...................... 370/349, 310.1, 328, 338, 252
See application file for complete search history.

(56) References Cited

U.S. PATENT DOCUMENTS

| | | |
|---|---|---|
| 8,670,390 B2 | 3/2014 | Shattil |
| 8,750,934 B2 | 6/2014 | Lucidarme |
| 8,918,540 B2 | 12/2014 | Carman et al. |
| 8,942,082 B2 | 1/2015 | Shattil |
| 8,942,197 B2 | 1/2015 | Rudnick et al. |
| 8,955,110 B1 | 2/2015 | Twitchell, Jr. |
| 8,983,455 B1 | 3/2015 | Frolov et al. |
| 9,042,333 B2 | 5/2015 | Shattil |
| 9,083,425 B1 | 7/2015 | Frolov et al. |
| 9,170,117 B1 | 10/2015 | Abuelsaad et al. |
| 9,275,645 B2 | 3/2016 | Hearing et al. |
| 9,302,782 B2 | 4/2016 | Frolov et al. |
| 9,337,889 B1 | 5/2016 | Stapleford |
| 9,356,727 B2 | 5/2016 | Immendorf et al. |
| 9,363,690 B1 | 6/2016 | Singh et al. |
| 9,406,237 B2 | 8/2016 | Downey et al. |
| 9,412,278 B1 | 8/2016 | Gong et al. |
| 9,432,095 B2 | 8/2016 | Berlin et al. |
| 9,479,392 B2 | 10/2016 | Anderson et al. |
| 9,479,964 B2 | 10/2016 | Jalali |
| 9,483,950 B1 | 11/2016 | Wang et al. |
| 9,529,360 B1 | 12/2016 | Melamed et al. |
| 9,537,561 B1 | 1/2017 | Kotecha et al. |
| 2006/0235584 A1 | 10/2006 | Fregene et al. |
| 2008/0095121 A1 | 4/2008 | Shattil |
| 2009/0118875 A1 | 5/2009 | Stroud |
| 2009/0216757 A1 | 8/2009 | Sen et al. |
| 2009/0326735 A1 | 12/2009 | Wood et al. |
| 2010/0170383 A1 | 7/2010 | Willner |
| 2011/0009053 A1 | 1/2011 | Anglin, Jr. et al. |
| 2011/0292976 A1 | 12/2011 | Sen et al. |
| 2012/0309288 A1 | 12/2012 | Lu |
| 2012/0322360 A1 | 12/2012 | Sen et al. |
| 2014/0022051 A1* | 1/2014 | Levien ................. G05D 1/0011 340/5.2 |
| 2014/0219124 A1 | 8/2014 | Chang et al. |
| 2014/0219449 A1 | 8/2014 | Shattil |
| 2014/0249693 A1 | 9/2014 | Stark et al. |
| 2015/0009945 A1 | 1/2015 | Shattil |
| 2015/0229434 A1 | 8/2015 | Shawn |
| 2015/0236778 A1 | 8/2015 | Jalali |
| 2015/0249498 A1 | 9/2015 | Minguez Rascon et al. |
| 2015/0301529 A1 | 10/2015 | Pillai et al. |
| 2015/0302858 A1 | 10/2015 | Hearing et al. |
| 2015/0339912 A1* | 11/2015 | Farrand .................. G08B 25/00 340/501 |
| 2016/0086621 A1 | 3/2016 | Hearing et al. |
| 2016/0095001 A1 | 3/2016 | Uelk et al. |
| 2016/0100415 A1 | 4/2016 | Mishra et al. |
| 2016/0116915 A1* | 4/2016 | Pulleti ..................... G01S 13/56 701/3 |
| 2016/0118059 A1 | 4/2016 | Hearing et al. |
| 2016/0119052 A1 | 4/2016 | Frerking et al. |
| 2016/0119938 A1 | 4/2016 | Frerking et al. |
| 2016/0134358 A1 | 5/2016 | Jalali |
| 2016/0135204 A1 | 5/2016 | Mishra et al. |
| 2016/0142880 A1 | 5/2016 | Talluri et al. |
| 2016/0189732 A1 | 6/2016 | Hearing et al. |
| 2016/0219506 A1 | 7/2016 | Pratt et al. |
| 2016/0245907 A1 | 8/2016 | Parker et al. |
| 2016/0246297 A1 | 8/2016 | Song |
| 2016/0300493 A1 | 10/2016 | Ubhi et al. |
| 2016/0300495 A1 | 10/2016 | Kantor et al. |
| 2016/0309337 A1 | 10/2016 | Priest et al. |
| 2016/0330771 A1 | 11/2016 | Tan |
| 2016/0335476 A1 | 11/2016 | Renkis |
| 2016/0337871 A1 | 11/2016 | Wieneke et al. |
| 2016/0357192 A1 | 12/2016 | McGrew et al. |
| 2016/0358432 A1 | 12/2016 | Branscomb et al. |

OTHER PUBLICATIONS

Liu Tao, Hu Yonghui, Hua Yu, Wu Meifang; "Study on Autonomous and Distributed Time Synchronization Method for formation UAVs"; 2nd International Conference on Electrical, Computer Engineering and Electronics (ICECEE 2015).

Hamed Rezaee, Farzaneh Abdollahi; "Synchronized Cross Coupled Sliding Mode Controllers for Cooperative UAVs with Communication Delays"; 51st IEEE Conference on Decision and Control; Dec. 10-13, 2012. Maui, Hawaii, USA.

S. Rayanchu, et al.; "Airshark: Detecting Non-WiFi RF Devices using Commodity WiFi Hardware," IMC '11 Proceedings of the 2011 ACM SIGCOMM conference on Internet measurement conference; pp. 137-154; Berlin, Germany—Nov. 2-4, 2011.

A. Patro, et al.; "AirTrack: Locating Non-WiFi Interferers using Commodity WiFi Hardware," ACM SIGMOBILE Mobile Computing and Communications Review; vol. 15 Issue 4, pp. 52-54; Oct. 2011.

K. Sayler, "A World of Proliferated Drones: A Technology Primer," https://www.cnas.org/publications/reports/a-world-of-proliferated-drones-a-technology-primer; Jun. 10, 2015.

T. Goodspeed, "Packets in Packets: Orson Welles' In-Band Signaling Attacks for Modem Radios," WOOT'11 Proceedings of the 5th USENIX conference on Offensive technologies; San Francisco, CA; 2011.

N.O. Tippenhauer, et al.; "On the Requirements for Successful GPS Spoofing Attacks," Conference: Proceedings of the 18th ACM Conference on Computer and Communications Security, CCS 2011, Chicago, Illinois, USA, Oct. 17-21, 2011.

N. Kothari, et al,; "Finding Protocol Manipulation Attacks," SIGCOMM '11 Proceedings of the ACM SIGCOMM 2011 conference pp. 26-37; Toronto, Ontario, Canada—Aug. 15-19, 2011.

J. Bellardo and S. Savage, "802.11 Denial-of-Service Attacks: Real Vulnerabilities and Practical Solutions," SSYM'03 Proceedings of the 12th conference on USENIX Security Symposium—vol. 12; pp. 2-2; Washington, DC—Aug. 4-8, 2003.

* cited by examiner

UNMANNED AERIAL VEHICLE INTRUSION DETECTION AND COUNTERMEASURES

CROSS-REFERENCE TO RELATED APPLICATIONS

This application claims priority under 35 U.S.C. 119(e) to U.S. Provisional Application Ser. No. 62/233,982, entitled "Unmanned Aerial Vehicle Intrusion Detection and Countermeasures," filed Sep. 28, 2015, which is incorporated by reference in its entirety.

BACKGROUND

I. Field

The present invention relates to detection of and countermeasure against remote-controlled vehicles, such as unmanned aerial vehicles (UAVs).

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

Techniques for disabling a UAV can include jamming its control signal with high-power radio frequency (RF) signals. Jamming is a Physical-Layer denial-of-service (DoS) attack that relies on transmitted radio signals to interfere with wireless transmissions whereby the attacker essentially spams the appropriate RF band with a much stronger signal than those used for network communications.

A UAV operator might employ an unconventional, and possibly unique, radio protocol to evade detection and countermeasures. Thus, there is a need in the art for a UAV detection and countermeasure system capable of detecting and responding to UAVs that employ unanticipated communication protocols. Furthermore, a UAV operator might employ an autopilot or waypoint mode in which there is little to no radio communication between a UAV and its controller. Thus, there is a need for a UAV countermeasure system capable of configuring exploits to target a UAV system in which little to no initial information about its radio protocol is known.

SUMMARY

Techniques employed in aspects of the invention differ from radio jamming in that they employ protocol manipulation, which comprises a set of subtle attacks which cause a system to perform in a manner that is inappropriate for a current condition or situation, but is not inappropriate for other conditions or situations. Techniques employed in some aspects can include degrading a signal (but not jamming it), intercepting a signal, modifying an intercepted signal, rerouting a signal, making a system undiscoverable, and/or spoofing signals.

In one aspect of the disclosure, a method comprises detecting wireless communication systems by extracting identifying features of transmitted signals of interest. The collected features are cross-referenced with a predetermined set of features corresponding to a set of known communication systems to determine if a match can be made. Even if a match cannot be made, the collected features can be compared to features of different signal types, such as to indicate a set of probable systems and/or probable signal types. This information can be used to determine if detected signals correspond to a particular communication system used with a target device (e.g., a UAV). If the target is deemed a threat, a set of exploits corresponding to the probable systems and/or probable signal types can be employed to remediate the threat. In accordance with certain aspects of the invention, the exploits can comprise protocol attacks.

Certain aspects of the disclosure are directed to blind signal detection, characterization, and finally attack/remediation. In such aspects, a protocol attack (such as a Physical-Layer protocol attack) can be provisioned to achieve any combination of these functions. For example, signal detection (and possibly system identification) can be enhanced by observing a targeted transceiver's response to such an attack. System detection can be enhanced by observing whether a system responds to such an attack, such as if the attack is localized to a specific geographical region. Signal characterization (and/or protocol identification) can be enhanced by observing responses to each Physical-Layer protocol attack. Furthermore, in addition to effecting attack/remediation, Physical-Layer protocol attacks can be adapted in response to observed behaviors (e.g., UAV flight behavior and/or detected transmissions). In some aspects, the Physical-Layer protocol attack is one component of a broader attack. For example, the Physical-Layer protocol attack can cause a state change in the target system, such as to expose another vulnerability that can be exploited, for example, using a higher-layer protocol attack. In some aspects, the UAV can be coaxed out of autopilot mode and into a communication mode, which may be subsequently exploited.

In some aspects, the above methods are embodied as software instructions on a computer readable memory. In some aspects, such software can comprise user controls designed to enable developers to develop tools, solutions, and capabilities for managing RF systems via protocol manipulations. In some aspects, a device comprising at least one radio transceiver is configured to perform the aforementioned methods. In some aspects, a system comprising multiple devices networked together is configured to perform the aforementioned methods.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth herein.

BRIEF DESCRIPTION OF THE DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
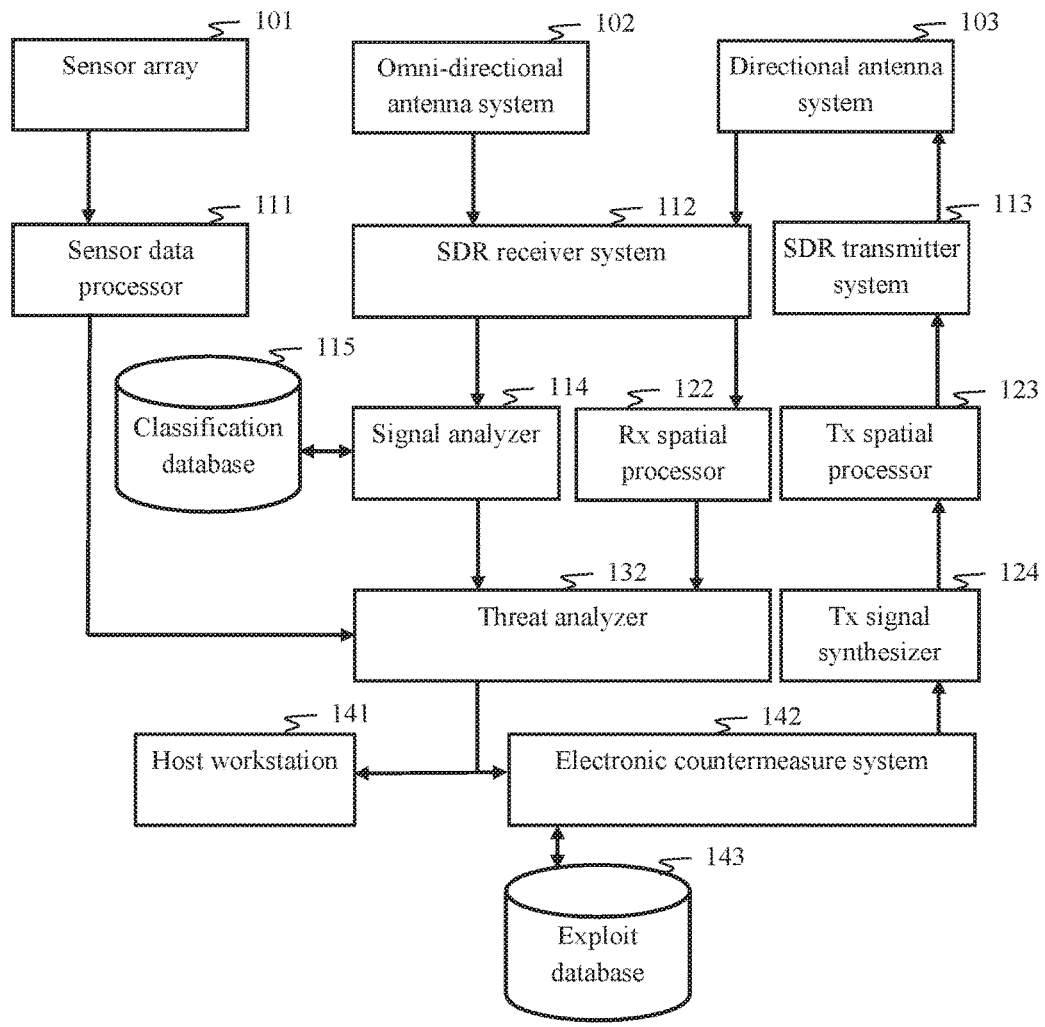
FIG. 1 is a block diagram of a communication system in accordance with an exemplary aspect of the disclosure.

FIG. 1 is a system diagram depicting one of many possible system configurations that can be employed in aspects of the disclosure. Radio systems employed in the system can include an omni-directional antenna system 102 and a directional antenna system 103. Antenna systems 102 and 103 are coupled to a receiver system 112, and antenna system 103 is coupled to a transmitter system 113. A signal analyzer 114 and (optionally) a receiver spatial processor 122 are coupled to the receiver system 112. The signal analyzer 114 is shown coupled to a classification database 115, and the receiver spatial processor 112 can be coupled to an optional transmitter spatial processor 123. A threat analyzer 132 processes inputs from the signal analyzer 114 and the optional spatial processor 122, and optionally, an input from a sensor data processor 111 coupled to a sensor apparatus, such as a sensor array 101. Outputs from the threat analyzer 132 are coupled to an electronic countermeasure system 142, and optionally, a host workstation 141. The countermeasure system 142 can be coupled to an exploit database 143. Outputs from the countermeasure system 142 are processed by a transmit signal synthesizer 124, which couples a synthesized signal to the transmitter system 113, optionally via the spatial processor 123.

Antenna system 102 can include quasi-omni directional antennas, wide-angle directional antennas, holographic antenna systems, and other antennas having a wide viewing angle. The antenna system 102 is configured to detect RF emissions from target UAVs and/or controllers communicating with the targets. The antenna systems disclosed herein can be configured for multiband operation. Such systems can comprise filters, LNAs, and ADCs.

Antenna system 103 can comprise any of various types of directional antennas. Antenna arrays, including distributed antenna systems, can be employed. Antenna systems 102 and/or 103 can comprise any combination of terrestrial and airborne platforms. An antenna system can be configured to function in both directional and omni-directional modes. Distributed antennas can be coordinated by a central coordinator via fronthaul links to individual antennas and/or sub-arrays.

In some aspects, an airborne network comprising airborne platforms can be used to monitor wireless communications. Although not shown, the airborne platforms can comprise wireless communication transceivers, such as radio transceivers, optical transceivers, and/or other wireless transceivers. In addition to sensing the wireless environment, the airborne platforms are configured to communicate with at least one ground station via a wireless fronthaul link. Airborne platforms may be configured to communicate between themselves.

In some aspects, local signal processing can be performed by the antenna system 102 and/or 103. For example, radio front-end processing (e.g., amplification, filtering, down-conversion, A/D conversion) can be performed on received radio signals to generate digital baseband signals, which are coupled to the receiver system 112. Similarly, processing, such as D/A conversion, up-conversion, and amplification might be performed by the directional antenna system 103. Some hierarchical processing and control structures can push certain processing operations to the edges of the network for a number of reasons, such as to reduce loads on the fronthaul network and/or to improve the handling of operations that are sensitive to latency. Pooling certain control and processing operations closer to the core of the network can provide various advantages, such as to facilitate processing scalability and reduce the cost, size, and power consumption edge components.

Signal detection and attack functions can be implemented across multiple OSI layers of the protocol stack, and multiple wireless protocols need to be supported. Thus, the monitoring and attack functions disclosed herein can be implemented on a software-defined radio (SDR) platform. For example, receiver system 112 can comprise multiple SDRs and/or multiple SDR instances. The SDRs can perform either or both SDR receiver functions and SDR transmitter functions. SDRs can be implemented remotely on processors coupled to each antenna of the antenna system 102 and/or 103 or coupling a cluster of antennas. SDRs can be located at a central coordinator CPU. SDRs can be implemented via Cloud computing by servers in a remote location, such as a data center. In one exemplary aspect, each SDR can be implemented with a GNU radio. Similarly, the transmitter system 113 can be implemented via SDR.

The signal analyzer 114 is configured to perform feature extraction and classification. Signal analysis can identify the radio signal type, and optionally, which target a signal corresponds to, the type of device (e.g., manufacturer, model number, operating system, etc.), and operating state(s) of the target device. In some aspects, signal analyzer 114 monitors transmitter behavior, such as handshakes and other control/management signaling. In some aspects, signal analyzer 114 monitors a device's response to a countermeasure. The response may be cross-referenced with the classification database 115, such as to aid in device identification. Thus, the response can be a feature of a particular radio protocol or device. In some cases, signal analyzer 114 logs the response to the classification database 115. The response may be forwarded to the countermeasure system 142 to be logged in the exploit database 143.

The classification database 115 comprises known radio signal types (e.g., modulation type and/or corresponding radio standard), their features (e.g., physical-layer features, frame format, control signal type, signaling behavior), and (optionally) devices that employ each radio signal type. In some aspects, due to flexibility in a radio protocol, optional control fields in a frame or characteristics of how a device communicates control and management messages can identify the device using a particular radio protocol. In other aspects, a device might transmit an identifier, such as a MAC address, from which the make and model of the device can be determined.

The spatial processors 122 and 123 can provide for both receive-side and transmit-side spatial processing, respectively. In some aspects, spatial processors 122 and 123 are implemented via SDRs. Spatial processor 122 can employ receiver spatial processing to generate receiver processing weights based on channel estimates derived from known reference signals transmitted by the target. In some aspects, a spatial processor determines the channel matrix corresponding to the target. The transmitter spatial processor 123 can use the measured channel matrix to calculate spatial precoding weights. Various techniques, such as zero-forcing, MMSE, and the like can be employed.

The threat analyzer 132 can process various metrics in a decision processing step to determine if a target is a threat. In one aspect, the target is in waypoint mode, so the threat analyzer 132 receives only sensor data, such as from the sensor data processor 111. When a target is transmitting, or its associated controller is transmitting, the threat analyzer 132 can process information signals provided by the signal analyzer 114. When the target is transmitting, the threat analyzer 132 might operate on spatial information provided by spatial processor 122. Information, such as including target location, heading, altitude, identity (or lack thereof), and/or type can be used to determine if the target is a threat. The threat analyzer 132 might employ any of various behavior metrics, including (but not limited to) the target's flight response to countermeasures and normal communications, and the target's communication behavior (which can include normal communications and how it responds to countermeasures).

Sensors 101 can include Radar, LIDAR, acoustic sensors, infrared sensors, magnetic induction sensors, camera systems, and others. Sensors 101 can comprise any of various types of telemetry systems and remote sensing systems. The sensor data processor 111 is configured to process data received from sensors 101, such as to detect boundary incursions, identify targets, generate and process coordinates to track targets, and possibly correlate sensor data with radio transmissions. Sensor systems can comprise active and passive systems. In some aspects, processor 111 is configured to perform various processing steps, such as clutter rejection, target filtering, range detection, azimuth & elevation measurement, and/or heading detection. For acoustic, infrared, and magnetic induction sensors, processor 111 may perform target discrimination, target identification, geolocation, matched filtering, and/or noise rejection.

In some aspects, the antenna system 102 and/or 103 can be employed as a sensor network, such as when a target transmits radio signals. A virtualized sensor may be provided programmatically by configurations in an SDR instance implemented in software and assigned to a particular target, the SDR instance being configured to follow the target as it moves by adapting its selection of sensor platforms (e.g., antennas of the antenna systems 102 and/or 103) dynamically to enhance reception. In such an example, both the receiver system 112 and spatial processor 122 can be implemented programmatically for each target as part of the SDR instance. Similarly, an attack profile for a specific target implemented by the synthesizer 124 and spatial processor 123 can be implemented programmatically via an SDR instance configured to adaptively select sensor platforms (e.g., antennas of the antenna systems 102 and/or 103) such as to increase the attack's effectiveness. In such an example, the transmitter system 113 and spatial processor 123 might be implemented for each target as part of the SDR instance. The SDR instance can be configured to comprise the exploit synthesizer's 124 functionality. In some aspects, the SDR instance can comprise a target-specific countermeasure system (e.g., system 142) program that is communicatively coupled to one or more physical hardware systems and/or functional embodiments common to multiple SDR instances.

In some aspects, the countermeasure system 142 is coupled to a user console, a situational awareness display system, an alert notification system, or some other command and control user interface equipment described herein as the host workstation 141. The countermeasure system 142 constructs an exploit or a sequence of exploits (which can be referred to as an exploit strategy) by retrieving exploits from the exploit database 143 based on information received from the signal analyzer 114. In some cases, system 142 relies only on sensor data (e.g., from sensor data processor 111) and executes an exploit strategy until a transmission received from the target can be processed by the signal analyzer 114 to classify the signal and/or device. When the target's radio system and identity are known, a corresponding exploit in the database 143 is selected. When the target and/or its radio system are unknown, system 142 can perform either or both of the following functions: 1) select an exploit that is likely to elicit a response from the target such that the signal analyzer 114 can classify the radio and/or system; and 2) select an exploit(s) based on the signal features that is likely to effect control of the target. In some aspects, system 142 can process exploits for multiple targets concurrently. In some aspects, system 142 can process multiple exploits concurrently for the same target and cause those exploits to be deployed concurrently. In response to a selected exploit strategy, the signal synthesizer 124 synthesizes a baseband signal(s) according to the selected exploit(s). In some aspects, the system 142 is configured to perform blind adaptive countermeasures, and may comprise a mitigation engine, a response analyzer, and an exploit adapter.

Figure 2:
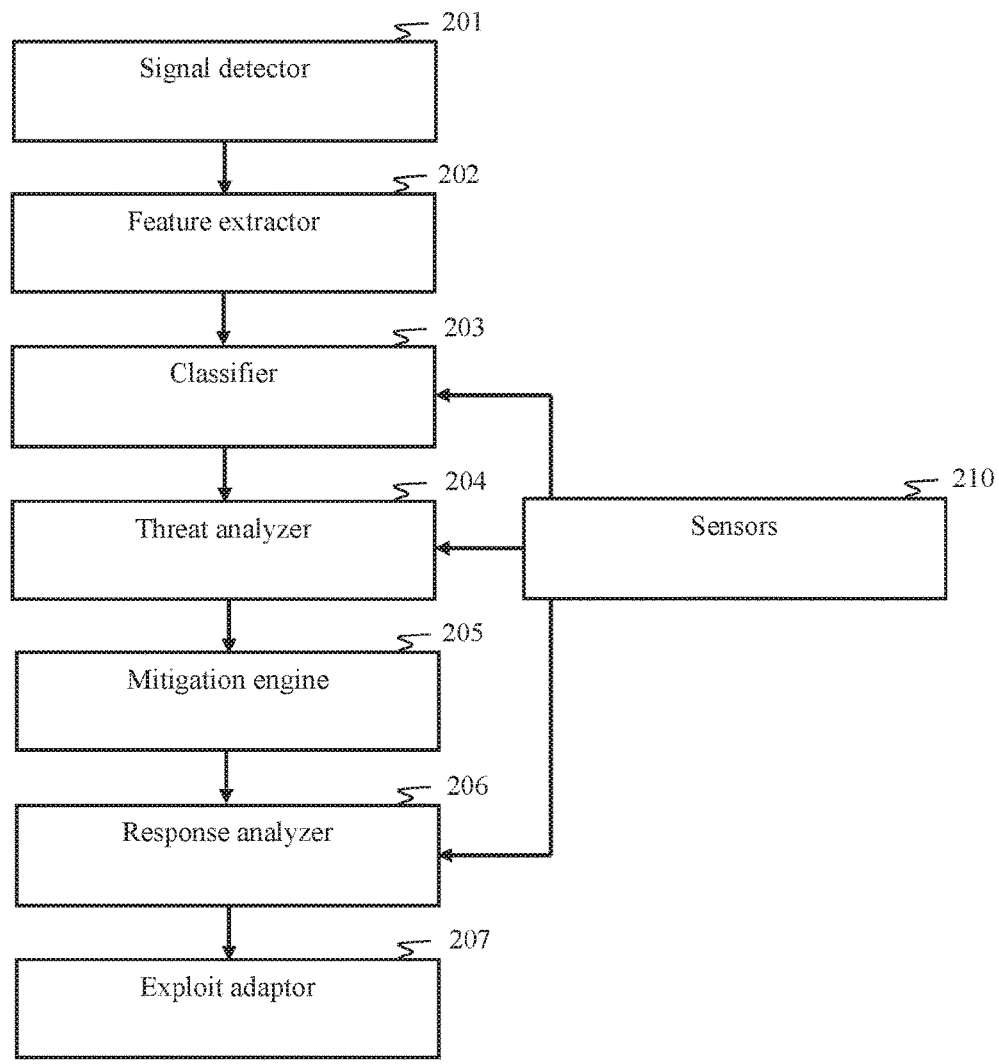
FIG. 2 is a block diagram that illustrates logical components of an apparatus configured to employ methods according to aspects of the disclosure.

FIG. 2 is a block diagram that illustrates logical components of an apparatus configured to employ methods according to aspects of the disclosure. A signal detector 201 is configured to detect radio signals communicated between a remote control unit and a remote-controlled vehicle (e.g., a UAV). A feature extractor 202 is configured to extract signal features from the detected radio signals, and a classifier 203 is configured to classify the detected radio signals based on the signal features and determine whether the detected radio signals correspond to a known or unknown radio protocol. A classification can include either or both a radio protocol classification and a device classification corresponding to the type of the remote-controlled vehicle. A threat analyzer 204 determines if a detected remote-controlled vehicle is a threat based on at least one of remote-sensing data and classification of the detected radio signals. A mitigation engine 205 is responsive to the threat analyzer 204 and configured to produce exploits based on the radio protocol classification, a device classification, and/or the signal features. The mitigation engine 205 normally selects exploits from the exploit database 143 based on the radio protocol and/or device classification. However, for unknown radio protocols and/or device types, the mitigation engine 205 further comprises an exploit adapter 207 configured to synthesize an exploit for a remote-control system that employs an unknown radio protocol based on corresponding extracted signal features. A response analyzer 206 may be provided to analyze a device's response (e.g., via sensor data and/or via received radio transmissions from the target) to an exploit and communicate its analysis to the exploit adapter 207.

Signal Detector 301

In accordance with some aspects of the disclosure, an SDR can be employed as both a primary sensor and an effector apparatus. Systems and methods disclosed herein can use machine learning and protocol manipulation, such as to detect, identify, track, and mitigate autonomous systems, such as UAVs. Signal detection can be initiated by a triggering event, such as a sensor output indicating an incursion of a perimeter or area by a UAV. Signal detection systems can employ various sensor types, such as radar, acoustical, cameras, magnetic induction, and the like.

Signal detection can employ radio transceivers configured to detect potential signals of interest, which can include traditional approaches to signal sensing and/or identification, as well as novel approaches, including machine learning and "Deep Learning" to categorize, identify, and potentially demodulate unknown signals. In one aspect, some functions are implemented in software and distributed across a plurality of devices in a network. By way of example, signal detectors (on the network edge) may perform pre-processing of received signals, and the pre-processed signals are then communicated via a fronthaul network to one or more central processors (possibly in a Cloud computing configuration) configured to perform downstream and/or aggregate processing of the sensor signals.

Central processing in a distributed radio system, as well as other systems and methods that are relevant to this disclosure, is disclosed in U.S. Pat. Pub. No. 20150244430 and U.S. Pat. No. 8,670,390, which are incorporated by reference in their entireties. Software-defined radios, as well as other systems and methods that are relevant to this disclosure, are disclosed in U.S. Pat. Pub. Nos. 20150244430 and 20110292976, and U.S. Pat. No. 8,942,082, which are incorporated by reference in their entireties.

Spectrum fragmenting can be employed to partition an observed frequency band into regions of interest and group them by similar characteristics (e.g., synthetic channels). In addition to identifying signals of interest anywhere within the band, spectrum fragmenting can reduce the data bandwidth that is pushed into an analysis pipeline. During the spectrum fragmenting process, incoming data from a software defined radio is monitored. When an appropriate triggering event occurs, the monitoring process (i.e., signal detection) initiates an event containing the necessary information for downstream processing. This can provides pre-filtering of the spectrum prior to particular types of analyses while storing the rest of the data for later analysis, such as low-power signal detection, including spread-spectrum signal types.

A triggering event can be based on comparing one or more measured signal attributes to a triggering threshold value. Attributes can represent a collection of measured signal characteristics that can also be used for filtering, matching, and organizing signal data. Attributes can be aggregately processed, such as to narrow candidate signal types, possibly providing a key to classify each signal type. This can be used to distinguish a signal of interest from other signals. Some examples of measured signal attributes include, signal bandwidth, center frequency, signal percent power relative to the pulse mean, pulse shape, angle of arrival, and XOR timing test constraint. It should be appreciated that other signal attributes may be used to identify and/or classify signals.

The signal detector 201 may comprise Fourier transform based processing algorithms to produce a periodogram or spectrum data. In one aspect, a peak-finding algorithm is performed on data corresponding to a given spectrum snapshot in order to filter the data. This algorithm can comprise calculating a mean power of the spectrum and its corresponding standard deviation(s) as part of a process to detect signals that cross an energy threshold. Spectral energy bins that are greater than the threshold are noted. Alternatively, other peak finding algorithms can be employed.

Next, noted bins comprising a contiguous block of energy having a bandwidth greater than some threshold bandwidth are retained. This is a filter criterion. For example, a minimum bandwidth threshold might comprise 1 MHz, which corresponds to a Bluetooth signal. In another aspect, a maximum bandwidth threshold might be employed to remove signals that are more likely to be video signals than radio controller signals. In some aspects, other filter criteria may be employed.

For such a signal region, the corresponding data is processed to provide measured attributes. For example, bandwidth, center frequency, mean power, pulse shape, etc. can be measured. By way of example, a measured normalized pulse shape may be compared to a set of template normalized pulse shapes and a decision might be made based on which template matches the measurement. In some aspects, a hard decision is made. In other aspects, a soft decision is made wherein the soft decision represents some confidence measure pertaining to the match. This soft decision (and possibly soft decisions related to other attributes) can be used in subsequent classification and electronic countermeasure processing. For example, the classifier 203 might employ soft decisions to calculate a most likely signal classification, which might also be a soft decision. Classification soft decisions and/or attribute soft decisions might be used to select or design an exploit (e.g., in the mitigation engine 205 and/or the exploit adapter 207). In some aspects, mixed decision processing is employed whereby a combination of soft and hard decisions can be generated.

Thus, the signal detector 201 can be configured to filter data in order to reduce bandwidth and processing loads on downstream processors, such as feature extractor 202 and classifier 203. For example, the received signal data can be filtered by frequency (as discussed above), filtered in time so as to provide only temporally relevant signals, spatially filtered, and/or filtered with respect to one or more attributes. In one aspect, metadata corresponding to one or more attributes is attached to the signal data output by the signal detector 201, which can be used to route the signal data to appropriate downstream processing algorithms in the feature extractor 202 and/or the classifier 203.

In some aspects, the signal detector 201 comprises an SDR and might operate a multi-tiered filter to filter raw data received from the SDR. Once a filtered stream of event data is generated by a first filter, a subsequent filter could further refine the event data into synthetic channels using the other attributes. For example, signal percent power relative to the pulse mean could be used to group signals having approximately the same signal strength. Angle-of-arrival can be used to further reduce the search space. Downstream analysis, such as timing and applying XOR constraints to observed pulses can further narrow the search space.

In one aspect, the signal detector 201 employs short-time Fourier transforms to produce spectrum data from the data output by an SDR. One or more filters are employed to filter the spectrum data and group filtered data with respect to a predetermined set of signal attributes, as described above. It is anticipated that attribute analyses can be adapted to account for changing conditions, including movement of a target of interest, hopping sequences, as well as other parameters. The data can be grouped according to a set of "events" which are based on different combinations of the measured attributes. For example, an event of type one might comprise a set of the spectrum data filtered according to a first attribute set and may comprise metadata. An event of type two might comprise a set of the spectrum data filtered according to a second attribute set and may comprise metadata. Similarly, the feature extractor 202 can comprise separate hardware and/or algorithms to process different event types. The feature extractor 202 can comprise a type one feature extractor and a type two feature extractor. Thus, the signal detector 201 might push type-one events to the type one feature extractor and type-two events are pushed to the type two feature extractor. In one aspect, for each event type, the feature extractor 202 unpacks the event to retrieve the spectrum data and then processes the spectrum data according to its event type. In some aspects, the feature extractor 202 processes the spectrum data to produce time-series data, for example. The time-series data can be filtered to smooth out time-domain and/or frequency-domain artifacts, such as spectral leakage and other effects.

In some aspects, at least one of the signal detector 201 and the feature extractor 202 can employ blind-adaptive decoding of the received radio signals. By way of example, the signal detector 201 can comprise a Fourier transform circuit followed by a decoder configured to perform blind-adaptive decoding. In such aspects, decoding is performed in the frequency domain. However, spatial and/or time-domain decoding could be performed. Decoding can comprise symbol estimation, demultiplexing, demodulation, despreading, and/or equalization. Blind-adaptive techniques can be employed for either or both signal analysis and signal synthesis disclosed herein. By way of example, blind-adaptive techniques can be implemented in the exploit adaptor 207 to synthesize exploit signals to be transmitted to a targeted UAV(s). The exploit adaptor 207 can operate in coordination with the response adaptor 206 and/or the signal detector 201 to provision blind-adaptive processing for exploit generation and/or adaptation. Aspects of the disclosure include blind-adaptive techniques and other apparatus and method embodiments disclosed in U.S. Pat. No. 7,965,761, which is incorporated by reference in its entirety.

Feature Extractor 202

In some aspects, a modulation classifier and a pulse-shape classifier might be part of the feature extractor 202. Additional signal features might be extracted, such as the format of a management frame (e.g., via a management frame classifier), the format of a control frame (e.g., via a control frame classifier), and/or the format of a data frame (e.g., via a data frame classifier). Certain symbols in any of the frames might be used to identify features and/or classify the signals. The extracted features can include behavior aspects (such as those corresponding to polling, error correction, authentication, acknowledgements, session management, responsiveness to certain messages or signal transmissions, transmission timing, and the like). Such behavior aspects might be inferred by messaging patterns, message lengths, message types, timing, etc. Behavior aspects can include how a system responds to an attack or other environment conditions, and/or how it interacts with other systems.

Automatic Modulation Recognition (AMR) is a technique in which received signals are analyzed to determine their modulation formats. By way of example, the feature extractor 202 (which can be implemented via an SDR) may comprise an automatic modulation classifier (AMC) that performs blind detection of the modulation scheme(s) present in the detected signal. AMR can be implemented as an intermediate step between signal detection and demodulation. Multiple AMR techniques have been described in the literature and can be divided into two broad categories: likelihood-based decision-theoretic and feature-based pattern recognition techniques.

The likelihood-based decision-theoretic approach addresses AMR as a composite hypothesis testing problem utilizing maximum likelihood (ML) techniques. Recognition classification is based on a comparison with calculated thresholds of some signal statistics. Variations of the ML technique can include average likelihood ratio test (ALRT), generalized likelihood ratio test (GLRT) or hybrid likelihood ratio test (HLRT), depending on the method used to compute the Likelihood Function (LF) involved in hypothesis-testing decision-making. In some cases, aspects of the invention can employ sub-optimal ML techniques.

In feature-based pattern recognition, modulation recognition can include data acquisition/pre-processing (training using known input patterns), feature extraction, and/or decision-making (matching with stored patterns). Feature-based pattern recognition algorithms can be based, for example, on signal statistics, cumulant, cyclostationary, multi-fractal, and Fourier-Wavelet Transforms. A signal statistics technique based on waveform statistics for calculating quantities, such as instantaneous amplitude, phase, and frequency and spectrum symmetry, can be applied to many commonly used modulation types, both analog and digital.

A signal higher-order statistics technique utilizes direct/cyclical cumulants and kurtosis as its feature set. It has good performance for low SNR and for relatively short signal observation periods, is robust in the presence of carrier phase and frequency offset, and it can be recursively applied. The signal cyclostationary spectral features technique can be applied to numerous modulations recognition and weak signals with considerable noise. Many time signal processes can be modeled as cyclostationary rather than stationary due to the underlying periodicities of the signals. For such processes both their means and autocorrelations are periodic.

A spectral correlation function (SCF), also known as spectral correlation density (SCD), can be obtained from the Fourier transform of the cyclic autocorrelation. A maximum value of normalized SCD over all cycle frequencies gives the cyclic frequency a profile. The spectral frequency f profile, obtained from the other dimension of the SCD surface, and the a profile can be concatenated to form cyclostationary feature vectors used for modulation format recognition. Cyclic spectral analysis deals with second-order transformations of a function and its spectral representation. A time waveform (process) x(t) is said to exhibit second-order periodicity if spectral components of x(t) exhibit temporal correlation.

The signal multi-fractal features technique can be applied to any smooth or rough waveform, a requirement that is fulfilled by most, if not all, modulation formats. Thus, it has very wide applicability and includes recognition of nonlinearly generated modulated signals with statistically irregular waveforms. Fractal dimensions extracted from signals contain information about magnitude, frequency, and phase, and can discriminate numerous modulation formats.

The signal wavelet transform (WT) technique can effectively analyze waveforms with sharp discontinuities and peaks. Also, the WT can be computed by fast and efficient algorithms, important fact for real time algorithm implementation. One technique determines the Continuous Wavelet Transform of each modulated data waveform and then uses the magnitude of the Fourier Transform of the result to generate a feature vector to be used in subsequent pattern recognition.

The signal constellation shape technique is can be used for amplitude/phase modulated waveforms in the presence of noise and phase errors. A tested constellation is repeatedly rebuilt until a satisfying configuration is achieved. The signal zero crossings technique can also be used for frequency/phase modulations. The signal radon transform technique is applicable to square/diamond (cross) shaped modulations of size 4 to 256 points because of the way radon transform scanning is applied and the result calculated, such as MQAM and V.29/32.

In some aspects, a combination of the above AMR algorithms may be employed, such as by a neural network. In one aspect, the received signals are processed to extract the signal statistics, cumulant, cyclostationary, multi-fractal, and Fourier-Wavelet transforms features of the waveforms, which are subsequently classified to match with appropriate stored feature patterns. This combination is sufficient to detect the most likely set of employed modulation formats, Quaternary Amplitude Shift Keying (QASK), Quaternary Frequency Shift Keying (QFSK), Quaternary Phase Shift Keying (QPSK), 16-Point Quadrature Amplitude Modulation (QAM-16 or QAM-4,4), and Gaussian Minimum Shift Keying (GMSK). It should be appreciated that in other aspects, different combinations may be employed.

In some aspects, an AMC comprises the feature extractor 202 and optionally a feature classifier. Some of the most common features include instantaneous amplitude, phase, and frequency; statistical features, such as higher-order moments and cumulants; wavelets; and spectral peaks. The classifier can use extracted features to identify signal modulation by applying a fixed threshold, or alternatively using a pattern recognition technique, such as artificial neural networks or support vector machines.

Entropic distance can be used to determine constant-envelope digital signals, such as PSK and FSK modulations. The received signal is compressed using a compression algorithm, and the compression ratio serves as an entropy measure of the received signal of an unknown modulation type. The normalized entropic distance can be used to classify different modulation schemes.

The AMC may employ a decision tree algorithm for classifying the most popular single-carrier modulations. In one aspect, the following features are considered: the maximum value of power spectral density (PSD) of normalized-centered instantaneous amplitude ($\gamma_{max}$), the maximum value of magnitude of discrete Fourier transform (DFT) of $k^{th}$ power of the received signal ($\Gamma_k$), and number of points in pre-defined ranges of partitioned signal constellation magnitude (this feature is based on counting the number of points of the magnitude of received signal constellation in a certain predefined range).

$$\gamma_{max} = \frac{\max|DFT(a_{cn}(n))|^2}{N_s}$$

where $N_s$ is the number of samples, $a_{cn}(n) = a(n)/m_a - 1$, $a(n)$ is the absolute value of the analytic form of the received signal, and $m_a$ is its sample mean, $$\Gamma_{max} = \frac{\max|DFT(a(i)^k)|^2}{N_s}$$

The third feature is useful in that noise-free normalized constellation points of PSK and FSK modulations are on the unit circle, whereas the normalized constellation points of QAM and APSK modulations may lie on, inside, and/or outside the unit circle. Therefore, this feature is useful in separating near constant amplitude modulations from amplitude varying modulations, and also in determining the order of amplitude varying modulations. For example, the magnitude of the normalized constellation diagram of a signal is partitioned into multiple predetermined regions, then the signal is classified by comparing the number of points in one or more pre-defined regions to a pre-computed threshold.

The values of each of the above features can be used in combinations to determine modulation type and order. A decision is taken at each step using one of the features which results in identification of either a type or order of an individual modulation. In one aspect, in the initial stages only modulation types are identified, and orders of the individual modulation schemes are determined in later stages.

Cyclostationary processors use autocorrelation to factor out noise since most noise is uncorrelated. For spectral correlation, the processor can comprise an FFT followed by a correlator. To detect frequency-hop spread spectrum (FHSS) signals, the feature extractor 202 may comprise a channelized radiometer, which can comprise a multi-channel receiver configured to integrate energy in multiple frequency bands simultaneously. Generally, FH signals are sparse in a time-frequency representation as short-time Fourier transforms, and they are wideband. Therefore, the measurements obtained with traditional Nyquist-rate sampling could be excessive. In some aspects, difference in cyclostationarity between FH signals and AWGN can be exploited in blind signal detection to detect FH signals. Compressive identification of FH signals can be employed via a small number of incoherent measurements without reconstructing the signal.

Classifier 203

Classification can employ the determined physical features of a signal, such as frequency, bandwidth, waveform characteristics (e.g., modulation type, pulse shape), and signal formats (reference signals, control signals, frame structure, signaling behaviors). Once enough features are extracted, the classifier 203 can determine not only the radio protocol, but often the targeted UAV make, model, version, and/or other details. Deeper analysis can be performed to capture telemetry information, allowing for extremely high confidence in identifying the target UAV(s). In some aspects, classification can identify the UAV controller type, including its technical capabilities and possibly its location. In one aspect, a likely location(s) of a ground-based controller device can be determined by a geographical mapping function that identifies terrain and structures that are suitable for controlling the target UAV(s). The radio transmissions can indicate the technical sophistication of the transceiver's designer, who might also be the system operator. The behavior of the UAV might also be used to classify its operator with respect to any of various parameters, including intent and mental profile.

In one aspect, signal features and/or protocol behavior features can be used to identify a specific radio protocol, such as a protocol indexed by corresponding features stored in a classification database. A query to the classification database might return one or more candidate radio protocols, such as one or more protocols that correspond to signal features in the query's criteria. Next, the target system might be identified. For example, the radio protocol (and optionally, other features) might be used to identify the target system. In one aspect, the classification database 115 contains radio systems (identified by manufacturer, model, and version) and/or remote-control systems (identified by manufacturer, model, and version) indexed by parameters, such as radio protocol and (optionally) signal features and/or protocol behavior features. Radio protocol and/or system classification might be processed jointly with sensor data from multiple types of sensors in order to classify a target UAV, for example.

In another aspect, when signal features and/or protocol behaviors do not correspond to a known protocol (i.e., a protocol stored in the classification database 115), the signal can be classified according to one or more likely protocol types. For example, a WiFi waveform transmitted in a cellular band might be distinguished from any of the expected LTE waveforms by its signal features (e.g., bandwidth, subcarrier spacing, symbol length, cyclic prefix, control and management signaling, etc.). While the signal might have at least some WiFi features, because it is transmitted in an unexpected band, it might be classified differently than other WiFi signals. For example, it might be classified according to a broad classification set, such as "OFDM", which encompasses multiple WiFi and LTE waveforms. In a subsequent mitigation step 305, exploits indexed by the more general OFDM classification might be used to create an attack strategy. In some aspects, attacks are generated using exploits indexed to specific subgroups under the OFDM classification by selecting each subgroup based on a likelihood parameter(s) or using an exhaustive search process. For example, such subgroups might include WiFi and LTE, and the target signal classified as OFDM might include a "likelihood" sub-classification of one or more WiFi variants.

Threat Analyzer 204

In accordance with some aspects of the disclosure, the threat analysis stage 204 is configured to determine if a detected UAV is a threat. The threat analyzer 204 can employ a variety of sensors and a processor configured to analyze the sensor data (e.g., sensor array 101 and sensor data processor 111). The processor 111 or threat analyzer 204 (132) can evaluate a target's range, altitude, speed, and heading. In some cases, a multi-level threat assessment might be made based on the target's proximity, altitude, speed, and/or heading. Threat assessment can be made based on observations of the target's size and shape. A threat assessment might be based on the UAV type or model, or determining that the UAV does not match any known UAVs in the classification database 115.

The threat analyzer 204 can comprise an authentication system (not shown) that communicates with the target via authentication messages. Challenge-response authentication or some other authentication mechanism might be employed. Authentication might include identification, and the threat analyzer 204 might validate a target's identity by comparing observations of the target with stored data about the target's type, its functional use, and its normal operating parameters.

The threat analyzer 204 can be configured to determine if a UAV is a threat based on its radio communications. For example, detected radio signals that do not correspond to a known radio protocol can indicate a threat. In some aspects, the threat analyzer receives a message from the classifier 203 when an unidentified radio signal is detected. The threat analyzer 204 might communicate with the sensors 101 and process sensor data to identify a UAV(s) corresponding to the unidentified radio signal. In some cases, a detected radio signal can be used to identify a threat before the UAV is airborne.

In some aspects, the threat analyzer 204 determines a characteristic of the detected radio signal, such as the radio protocol, the location of the transmitter, and a device identifier (e.g., an International Mobile Subscriber Identity, an MSISDN, a MAC address, an IP address, or some other identifier). This characteristic is then compared to an authentication database (not shown), which can comprise a list of permitted devices, each device's radio protocol, and each device's permitted range of geographical locations. A target that fails to match the authentication criteria is labeled as a threat.

In some aspects, the threat analyzer 204 can be configured to observe and evaluate a target's behavior. A target's behavior might include its navigational behavior, such as where the target flies with respect to waypoints and/or other UAVs. A target's behavior might include its radio behavior, such as how frequently it transmits, how frequently it changes channels, and/or at which points during its flight does it communicate. Other behaviors can include the target's attempts to access a radio network, if the target abides by network protocols, and/or if the target's behavior matches a known attack signature. Other types of behavior may be tracked and analyzed.

The threat analyzer 204 can be configured to detect anomalous behavior of a target and then generate a notification that the target is a threat. In some aspects, anomalous behavior may be employed as a condition that warrants increased scrutiny by the threat analyzer 204. In some aspects, the threat analyzer 204 can detect that the target device is not the device type the target claims to be. For example, the authentication database (not shown) might classify a target device as a first device type, whereas the threat analyzer might detect that the target is employing a radio protocol, employing a frame format variant, transmitting metadata, or the like that corresponds to a second device type or is otherwise inconsistent with the first device type. In another aspect, the threat analyzer might detect that the MAC address transmitted by a target identifies itself as a first device type, yet the target's other behavior(s) (e.g., the target's transmissions, flight behavior, etc.) might be inconsistent with the first device type. Thus, upon detection of spoofed identifiers, spoofed credentials, and/or other spoofed parameters, the threat analyzer 204 might identify the target as a threat. Various techniques configured to perform authentication and threat analysis, as well as other techniques relevant to this disclosure, are disclosed in U.S. Pat. Pub. No. 20160226892 and U.S. Pat. No. 8,254,847, which are incorporated by reference in their entireties.

Mitigation Engine 205

In accordance with some aspects of the disclosure, the mitigation stage 205 enables the system to take control of one or many UAVs to stop them, land them, redirect them, harvest data, control sensors on the UAV(s), or take total control. Protocol manipulation can allow for granular, surgical, and sophisticated mitigations using minimal power, often less than a single Watt at more than one kilometer range. One aspect of mitigation comprises protocol manipulation. Protocol manipulation is a technique that can exploit a radio protocol format to manipulate a radio into behaving in a manner that is desirable from an attacker's perspective and within normal operating parameters of the radio protocol and/or system specifications. However, while the radio may behave within normal operating parameters, which makes a protocol manipulation attack difficult to detect by the targeted system, the behavior is often not appropriate for the system's current conditions and/or operating state.

Protocol manipulation can be employed to expose a device's vulnerabilities and can be used as a prelude to additional attack modalities. Protocol manipulation can be useful since most (if not all) digital radio protocols have vulnerabilities related to beaconing, announcements, authentication, pairing, key exchange, and the like. Furthermore, protocol-based exploitation is difficult for a system operator to avoid. While the operator might change the frequency or waveform of a radio signal, it is considerably more difficult to avoid the control and management mechanisms necessary to establish and maintain a radio link.

In one aspect of mitigation, protocol manipulation provides for positive control of a UAV identified as a threat. In this case, positive control means effecting a deterministic outcome of the targeted device by maintaining continuous control over the device. This is different than traditional electronic warfare or kinetic countermeasures, which often have unintended outcomes. Protocol manipulation can be used surgically to target a specific device in a group or to target numerous devices (such as a swarm of devices) concurrently.

Figure 3:
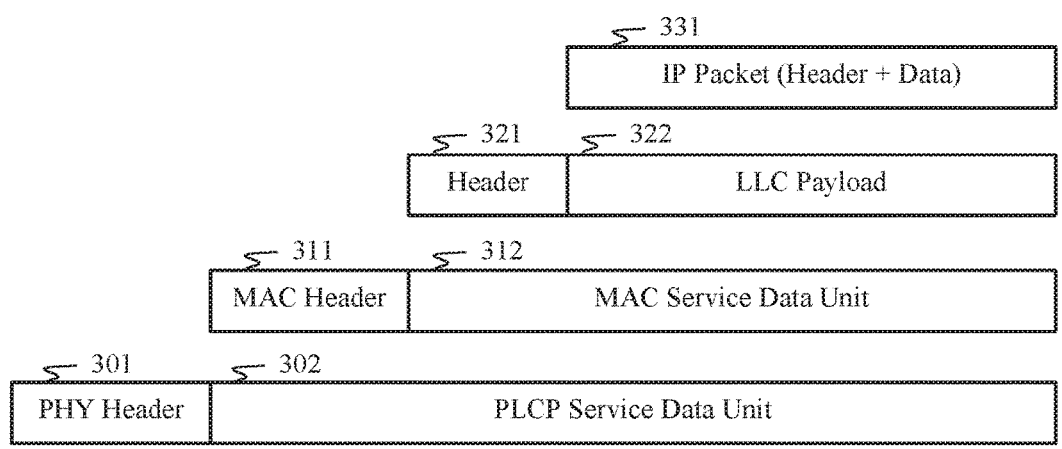
FIG. 3 illustrates different levels of a signal that can be exploited in accordance with aspects of the disclosure.

FIG. 3 illustrates different levels of a signal that can be exploited in accordance with aspects of the invention. At the Physical layer, a Phy-Layer Convergence Protocol (PLCP) Protocol Data Unit comprises a Phy-layer header 310 and PLCP Service Data Unit 302. The PLCP Service Data Unit encapsulates MAC Protocol Data Units, which comprise a MAC header 311 and a MAC Service Data Unit 312. The MAC Service Data Unit comprises a Logical Link Control (LLC) header 321 and payload 322. Within the LLC payload are IP packets, each of which includes a header and data (331).

As shown in FIG. 3, a passive attack on a target can comprise determining penetration depth into the protocol stack of the target's communications before mounting an active attack. An active attack that can employ a sequence of exploits that penetrate the protocol stack is referred to as a penetration attack. As a penetration attack manipulates deeper layers of the protocol stack, the attack might acquire more control over the target system. For example, a Phy-Layer attack can effect an interruption of a radio link as a prelude to a MAC-Layer attack which might cause an access point or station to connect to an unintended device. Penetrating the data payload of the IP packets can enable cross-layer attacks. Penetration attacks can lead to causing state changes in the target system, exposing vulnerabilities in the system's firmware or software. Penetrating the application layer can enable mitigations that inject commands into flight navigation system.

In some aspects of the disclosure, exploitation of Physical Layer vulnerabilities is of particular importance, particularly when higher-layer exploits are not attainable. The goal here is to not simply jam communication signals, since jamming is easily detected and can produce collateral effects, such as interfering with a legitimate user's access to network resources. Rather, a manipulation attack is performed with Physical-Layer signaling in which unexpected or malformed signals cause the system to behave in a manner that impedes its ability to serve a particular device or set of devices. Unlike at higher layers in which transmitted messages exploit bugs or inadequate defenses (e.g., buffer overflows) in protocol implementations to crash or hijack victims, a Physical-Layer protocol attack induces honest nodes to exhibit undesirable behaviors, such as via misrepresenting network conditions. In these attacks, the goal might not be to immediately disable or hijack a target UAV, but to induce other behaviors that harm the target, thwart its mission, and/or make it vulnerable to other attacks.

In addition to being directed at the Physical-Layer headers (which may comprise preamble sequences for acquisition and synchronization, channel equalization data, cyclic prefixes, guard intervals, and/or other control information), a Physical-Layer protocol attack can be directed to other control signals, including (but not limited to) pilot subcarriers, beacon signals, and power control signals. For example, since pilot subcarriers are used as a reference for phase and amplitude to help an OFDM receiver demodulate the data in the other subcarriers, even slightly polluting these reference tones can subvert the receiver's equalizer. Frequency offsets in the pilots can destroy orthogonality of the subcarriers. Similar effects can be achieved by synthesizing an adverse multipath environment, such as by repeating transmissions with a delay that exceeds the guard interval in order to introduce inter-symbol and inter-carrier interference. Other Physical-Layer attacks can be performed, some of which can facilitate access to higher-layer vulnerabilities in the protocol stack.

Instead of relying only on implementation bugs in protocols, protocol manipulation attacks can leverage the fact that individual participants do not have complete knowledge of network conditions (e.g., wireless channel conditions, amount of congestion, etc.) or other participants' intent. Attackers can exploit this incomplete knowledge by misrepresenting network conditions and thus induce undesirable behavior from the perspective of the target UAV's controller.

While some aspects of the disclosure include techniques that mount attacks at a lower layer (e.g., Layer 1) in order to penetrate a higher layer (e.g., Layer 2), other aspects can exploit a higher layer(s) to attack a lower layer(s). Such attacks can provide a way of affecting the network stacks' perception of the lower layer medium and messages by merely manipulating the payloads of a higher layer. Such attacks against the layer boundaries can produce cross-layer interactions that are not intended or even detectable by the targeted system. Examples of cross-layer manipulations and other relevant systems and methods are disclosed in U.S. patent application Ser. Nos. 15/218,609 and 62/252,717, which are incorporated by reference in their entireties.

One failing of the OSI model is the suggestion that its layers are naturally isolated, with the only data flows between the layers being those provided by the endpoints' network stack APIs. The layer paradigm makes it easy to believe that different designs or implementations of a given layer are interchangeable, and can be largely dealt with (e.g., designed or analyzed for security) independently. This deception, for example, can allow an attacker to hide malicious packets inside packets that are permitted on the network. When the beginning of the outer frame is damaged due to interference, signal strength, or tuning problems, the inner frame is interpreted as a packet rather than a payload. In some aspects of the disclosure, a Physical-Layer protocol attack can be performed to induce a target receiver to disregard the beginning of the outer frame.

One technique for raw frame injection can comprise placing a complete radio frame within the body of a larger frame, then leveraging a Physical-Layer manipulation attack to cause the start of the outer frame to be missed. Once this happens, the receiving radio will continue to process the start of the outer packet as if it were noise. Upon reaching the interior packet, the receiver—thinking this to be the start of a unique packet—will interpret it as a packet in its own right rather than as data within an upper-layer protocol.

The capability to inject messages into the medium used by a network enables many kinds of attacks. In fact, many attack toolkits are built around libraries that provide and streamline injection. The underlying reason as to why packet injection has always been a fruitful attack methodology is that many network stack and protocol implementations make de-facto trust assumptions regarding the origin and integrity of the headers and data.

Aspects of the disclosure provide for various types of Physical-Layer protocol attacks, and such attacks can be mounted at the Physical Layer and/or via frames at higher layers. Physical-Layer protocol attacks can take various forms as disclosed herein and may be provisioned for various purposes. In one aspect, the attacker employs a Physical-Layer protocol attack to impede or disrupt communications, such as to provide more time for deciphering packets and/or preparing to mount an attack. For example, this can facilitate a Layer-Two MITM attack to spoof packets, which are sent to the target (either or both the target UAV and its controller) in order to take control of the device. In one aspect, the attacker simply injects false packets into the network. In another aspect, the attacker sniffs the network traffic, intercepts packets, modifies the packets, and then forwards the modified packets to their intended destination.

While it is well-known that a denial-of-sleep attack can be mounted at the MAC layer to reduce the sleep duration of a radio transceiver, and thus drain its power, another method for draining power is to manipulate the radio power control features in the Physical-Layer transmission protocol so battery-powered devices are tricked into transmitting at maximum power. This can also facilitate detection and tracking of target UAVs and their controllers.

By penetrating the PLCP Service Data Unit 302, additional attacks can be mounted. The Data Link layer is divided into the MAC sublayer and the Logical Link Control sublayer. The MAC's function is to determine if the physical medium is available for transmission.

The MAC may employ CSMA/CD to manage shared channels. Wireless networks, such as 802.11, employ CSMA/CD. A host checks to see if the medium is being used and waits for a period of time to re-check. Often, this period is increased each successive time the medium is busy, so this feature can be exploited by an attacker to impede communications. If a collision is detected, it notifies all hosts on the shared medium that a collision has occurred. This too can be exploited by an attacker. Vulnerabilities in the 802.11 MAC protocol allow an attacker to selectively or completely disrupt service to the network using relatively few packets and low power consumption.

Identity vulnerabilities arise from the implicit trust 802.11 networks place in a speaker's source address. As is the case with wired Ethernet hosts, 802.11 nodes are identified at the MAC layer with globally unique 12 byte addresses. A field in the MAC frame holds both the senders' and the receivers' addresses, as reported by the sender of the frame. For "class one" frames, including most management and control messages, standard 802.11 networks do not include any mechanism for verifying the correctness of the self-reported identity. Consequently, an attacker may "spoof" other nodes and request various MAC-layer services on their behalf. This leads to several distinct vulnerabilities.

The de-authentication/disassociation attack is fairly straightforward to implement. After an 802.11 client has selected an access point to use for communication, it must first authenticate itself to the AP before further communication may commence. Moreover, part of the authentication framework is a message that allows clients and access points to explicitly request deauthentication from one another. Unfortunately, this message itself is not authenticated using any keying material. Consequently the attacker may spoof this message, pretending to be the access point or the client, and direct it to the other party. By repeating the attack persistently a client may be kept from transmitting or receiving data indefinitely.

Similarly, the association protocol that follows authentication can be exploited. Since a client may be authenticated with multiple access points at once, the 802.11 standard provides a special association message to allow the client and access point to agree which access point shall have responsibility for forwarding packets to and from the wired network on the client's behalf. As with authentication, association frames are unauthenticated, and 802.11 provides a disassociation message similar to the de-authentication message.

Congestion-based MAC layer denial of service attacks have also been developed. One attack exploits the SIFS period in CSMA that a transmitting node must wait before retransmitting. An attacker can monopolize the channel by sending a short signal before the end of every SIFS period. In another exploit, an attacker asserts a large duration field to reserve the channel, thus preventing clients from accessing the network.

The power conservation functions of 802.11 also present several identity-based vulnerabilities. To conserve energy, clients are allowed to enter a sleep state during which they are unable to transmit or receive. Before entering the sleep state the client announces its intention so the access point can start buffering any inbound traffic for the node. Occasionally the client awakens and polls the access point for any pending traffic. If there is any buffered data at this time, the access point delivers it and subsequently discards the contents of its buffer. By spoofing the polling message on behalf of the client, an attacker may cause the access point to discard the clients packets while it is asleep.

Similarly, it is possible to trick the client node into thinking there are no buffered packets at the access point when in fact there are. Other control messages, such as those that manage synchronization, are transmitted without authentication and may be spoofed to thwart communications.

Due to the prevalence of Ethernet in network infrastructures, the Ethernet frame can be exploited for attacks. The Ethernet frame comprises source and destination MAC addresses, an "EtherType" field identifying the protocol encapsulated by the Ethernet frame, and a 4-byte trailing Cyclic Redundancy Code for error detection. The MAC address comprises 6 bytes. The first 3 bytes are unique to each manufacturer, and the last 3 bytes (which are assigned by the manufacturer) are unique to each network card. There are many online databases that link the first three bytes to manufacturer, and ranges within the last three bytes are associated with models. This information can be particularly useful to an attacker, as device drivers used to control network cards are often vulnerable to attack. An exploit database can be used to select an attack that is particular to the type of network card identified by its MAC address.

Other protocols, such as PPP or SLIP, may be used as alternatives to Ethernet frames. For example, SLIP is used for 802.3 wireless Ethernet. Thus, an attack can be adapted to the type of protocol employed.

The LLC sublayer handles multiplexing and demultiplexing of protocols on top of the Data Link layer, and supports ARP, RARP, and the IP. The LLC also provides flow control and re-transmission for dropped frames.

If the attacker can penetrate the payload of the Ethernet frame, the data packet structure provides opportunities to mount network-layer and transport-layer attacks. The IP header can be used, such as via fingerprinting, which exploits peculiarities of IP, TCP, UDP, and ICMP to determine the operating system. The classifier 203 might exploit differences in the way that various operating systems format headers and transmit information, which make it possible to discover both the operating system and the specific version. Fingerprinting may employ either or both passive and active variants. Fingerprinting can be accomplished by observing the following fields found in the TCP and IP headers: TTL value, Don't Fragment bit, Type of Service, and Window Size.

Unauthenticated management frames provide easy vulnerabilities to exploit. For example, the RTS, CTS, and ACK frames in 802.11 are not authenticated. By acknowledging packets even before they are received, an adversarial TCP receiver can manipulate the sender into sending at a rate faster than that dictated by congestion control dynamics. An ECN (Explicit Congestion Notification) receiver can manipulate the sender into ignoring congestion by simply flipping a bit in the packet headers.

A collision attack comprises spoofing packets received at a receiver. This can be done by causing either or both the header checksum and the payload checksum to fail. For example, when the checksum fails, the entire packet is discarded and it requires retransmission. This can be achieved by many techniques, including injecting previously transmitted packets (e.g., replay attacks), injecting false packets, and mixing packet transmissions from different channels to cause inter-channel interference. A related type of attack modifies control flags, such as identification tags and fragment tags, as well as TCP sequence numbers. An attacker could also mount an impersonate attack by forging MAC addresses and/or IP addresses.

In some instances, encryption of the data packet can be breached, which enables additional exploits for the attacker. For example, weaknesses in the wired equivalency protocol (WEP) intended to provide data privacy between 802.11 clients and access points enables an attacker to recover the secret key used to encrypt the data packets. In some instances, frames can be modified, new frames injected, authentication frames can be spoofed, and plain text can be recovered from encrypted frames without requiring knowledge of the shared key.

Figure 4:
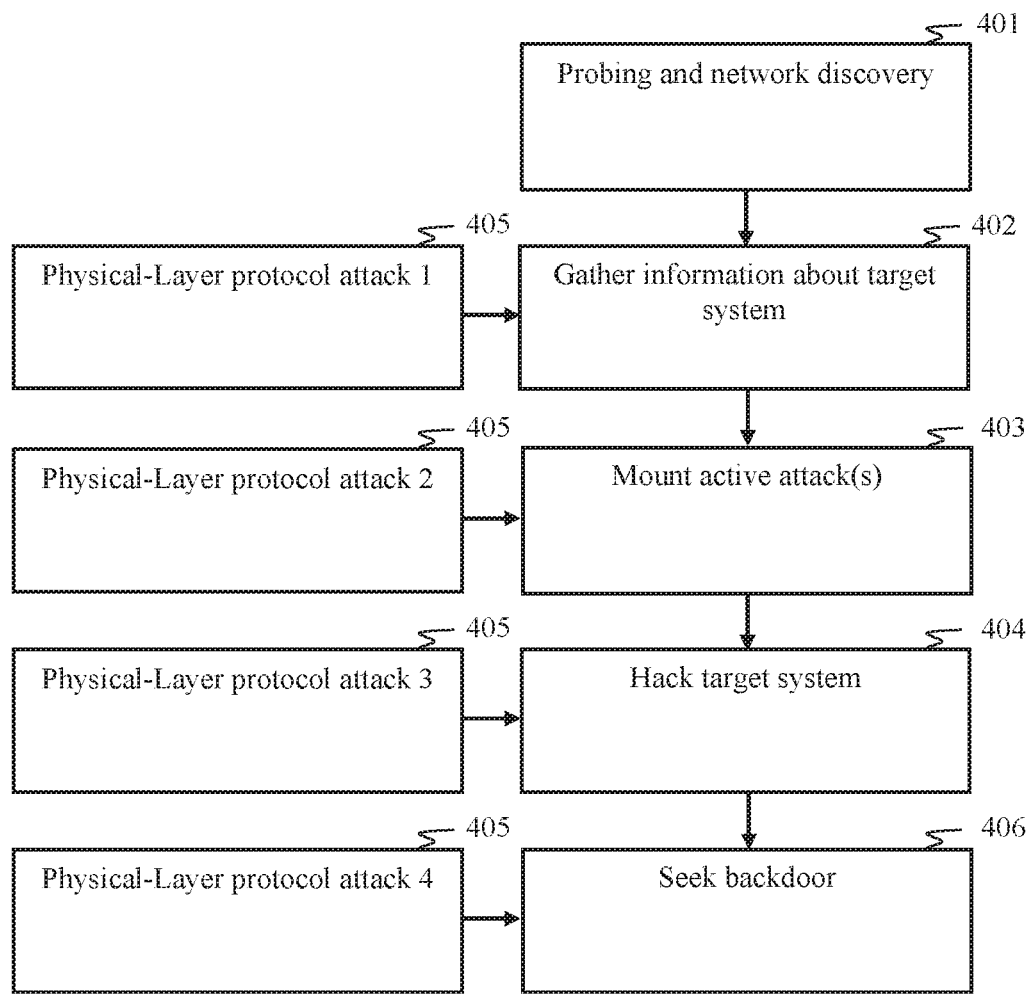
FIG. 4 is a flow diagram of a method configured in accordance with another aspect of the invention.

FIG. 4 is a flow diagram of a method configured in accordance with one aspect of the disclosure. In Step 401, probing and network discovery are initiated. Any combination of active and passive probing can be employed. Active probing typically comprises sending probe requests in order to solicit a probe response, which can be used to identify access points. Active sniffing comprises injecting packets into the network that causes traffic to be sent to the attacker. Passive probing consists of sniffing network traffic. For 802.11 networks, a tool with the capability of Kismet can be used for passive probing and a tool with the capability of NetStumbler can be used for active probing. Specific wireless networks can be identified by their beacon transmissions.

In Step 402, once a wireless target is identified, the system gathers information about the system. For example, the system can use a tool with the capabilities of Kismet or Airodump. Data gathered can be saved for subsequent offline analysis. Information gathering 402 can comprise a combination of passive and active techniques. In one aspect, the link can be disrupted such as to force a client and access point to return to a connection mode in which authentication, association, and channel allocation processes are repeated in order to aide information gathering 402. Such disruptions can be effected via Physical-Layer protocol attacks. Furthermore, Physical-Layer protocol attacks can facilitate higher-layer attacks 403, such as exploitation of authentication, association, and channel allocation processes.

Active attacks in Step 403 can include spoofing and DoS attacks, which are well known in the art. Spoofing is the most common. For example, many wireless APs maintain lists of permitted MAC addresses. Through various tools, such as Netstumbler, an attacker can identify the MAC address used by a valid client and modify its own MAC address to access the network. DoS attacks typically involve sending multiple control packets in order to degrade performance. A MITM attack can involve spoofing an access point wherein a client is unable to distinguish a spoofed access point from a legitimate one without running additional authentication protocols.

In Step 404, the target system is hacked. If the traffic stream is not encrypted, the system can immediately access network parameters from the traffic. Otherwise, the system can crack the encryption. Some cracking tools require a certain amount of traffic on the network. Thus, certain aspects can provide for Physical-Layer protocol attacks that manipulate the network devices to produce the required amount of traffic. For example, such attacks can manipulate a device into transmitting a sufficient number of initialization vectors to crack an encryption key or repeat transmissions of known plaintext to facilitate cracking.

In one aspect of the invention, the system can seek a backdoor 406 into the target by exploiting a secondary communication portal that might be overlooked by the target's operator. For example, Bluetooth technology is making its way into all kinds of devices, and it is especially attractive due to its low cost and minimal resource requirements. Due to its short range, the vulnerability of Bluetooth is often overlooked. However, a system configured in accordance with aspects of the disclosure can employ a high-gain antenna, particularly an antenna system with high directivity, to remotely exploit Bluetooth.

Response Analyzer 206

Using machine learning techniques, the mitigation engine 205 can apply different protocol-based exploits against a target, monitor the effects of each exploit, and then adapt exploits as needed. In some aspects, the response being analyzed is the flight of the target. In other aspects, the target's radio behavior is analyzed by the response analyzer 206.

The exploit can comprise commands and/or data configured to manipulate the target system, such as to adapt or control its behavior in a predetermined manner. This process can negotiate an initial authentication communication, for example. In some aspects, the exploit can cause the target system to change its operating mode or state, such as forcing it into a default mode or backward-compatibility mode in which it might provide backward compatibility for a legacy communication protocol, such as a protocol which has easily exploited security vulnerabilities. By forcing the target system to behave in a predetermined manner, the response analyzer 206 of a protocol manipulation agent 205 can gather information about the target which can be used to coax the target into a state that is more vulnerable to further exploits. In one aspect, the exploit forces the target to reestablish its connection, thus opening a dialog procedure which can be exploited. Certain messages, such as those involved in establishing a connection, precede a secure communication link and thus are more vulnerable to exploitation.

Exploit Adaptor 307

An exploit takes advantage of weaknesses in the protocol by which a client and server are communicating to perform unexpected actions. Communication protocols are necessary to transfer messages between client and server applications. Moreover, different protocols may be used for different types of interactions. For example, an authentication protocol might be used to establish the identities of the server and client while a separate messaging protocol might be used to exchange data. If there is a weakness in a protocol used by the client and server, an attacker might take advantage of this to perform various types of attacks. For example, if the attacker is able to manipulate an authentication protocol, the attacker may be able spoof other clients or servers. If the attacker is able to manipulate a messaging protocol, the attacker may be able to read user data and modify message contents. This attack is often made easier by the fact that many clients and servers support multiple protocols to perform similar roles. For example, a server might support several different authentication protocols in order to support a wide range of clients, including legacy clients. Some of the older protocols may have vulnerabilities that are easier to exploit. Some exploits can be adapted to take advantage of the limited command set of UAVs and the similarity of most UAV radio-control protocols.

In cases where a radio protocol or device type has never been seen before, the mitigation engine 205 can extract enough features via the radio receiver (and possibly the sensors) to provide enough details to create an attack. Exploit adaptation 207 can be an iterative process of interrogating a device, gathering information about the device via its responses, and further tailoring the exploit(s).

The system might capture and decode a UAV's raw telemetry data. This can provide not only geolocation of the UAV, but information about the UAV's controller, status of the UAV, and other information. In some cases, depending on the UAV type, the mitigation engine 205 can cause a target to provide UAV sensor data, such as video, accelerometer, and other onboard system data. Exploits that may be adapted on the fly include attacks to exploit a protocol implementation flaw, attacks to exploit application-layer vulnerabilities, and attacks that flood a device with messages, as well as other attacks.

Implementation flaw attacks can be employed when a specific flaw in the implementation of a device is exploited. A malicious packet may interact with the software or firmware in the device to cause an unexpected behavior, such as excessive memory use, excessive disk use, excessive processor use, a system reboot, or a system crash. An exposed vulnerability may be due to improper maintenance of software running in the device (e.g., a bad software patch). The vulnerability that causes the unexpected behavior may reside in various different levels of the network protocol stack, such as the TCP layer, the SIP layer, or in the underlying operating system.

One application-layer vulnerability exploit manipulates a feature of the session control protocol to deny service to non-malicious users. A protocol manipulation attack can comprise an attacker sending a legitimate request that deviates from the intended purpose of the protocol in a way to overburden the device. These types of attacks include registration hijacking, call hijacking, and media modification. Message flooding attacks send a large number of packets to the targeted device in order to overwhelm the processing capacity of that device. In this case, the device is too busy to process legitimate packets.

In some aspects, a signal might lie outside the standard set of known transmission types. For example, a WiFi signal may be transmitted at a cellular frequency or some other frequency in an attempt to avoid detection. An otherwise short-range signal, such as Bluetooth or WiGig, might be used for medium- or long-range communication via high gain antennas. In other cases, more exotic changes may be made to the Physical-Layer to escape detection. In such aspects, the response analyzer 206 can perform feature extraction of signal transmissions from a target device in response to an attack to help identify variants of known transmission types. The response analyzer 206 might classify such signals, the target's radio transceiver, and/or the target remote-controlled vehicle. Different signals types that share similar features may be found to have similar vulnerabilities, which can be help select and/or adapt an exploit. Therefore, even if a signal of interest can't be explicitly linked to a standard radio protocol or transceiver type, an attack profile can be selected by the exploit adaptor 207 based on one or more of the signal features.

Figure 5:
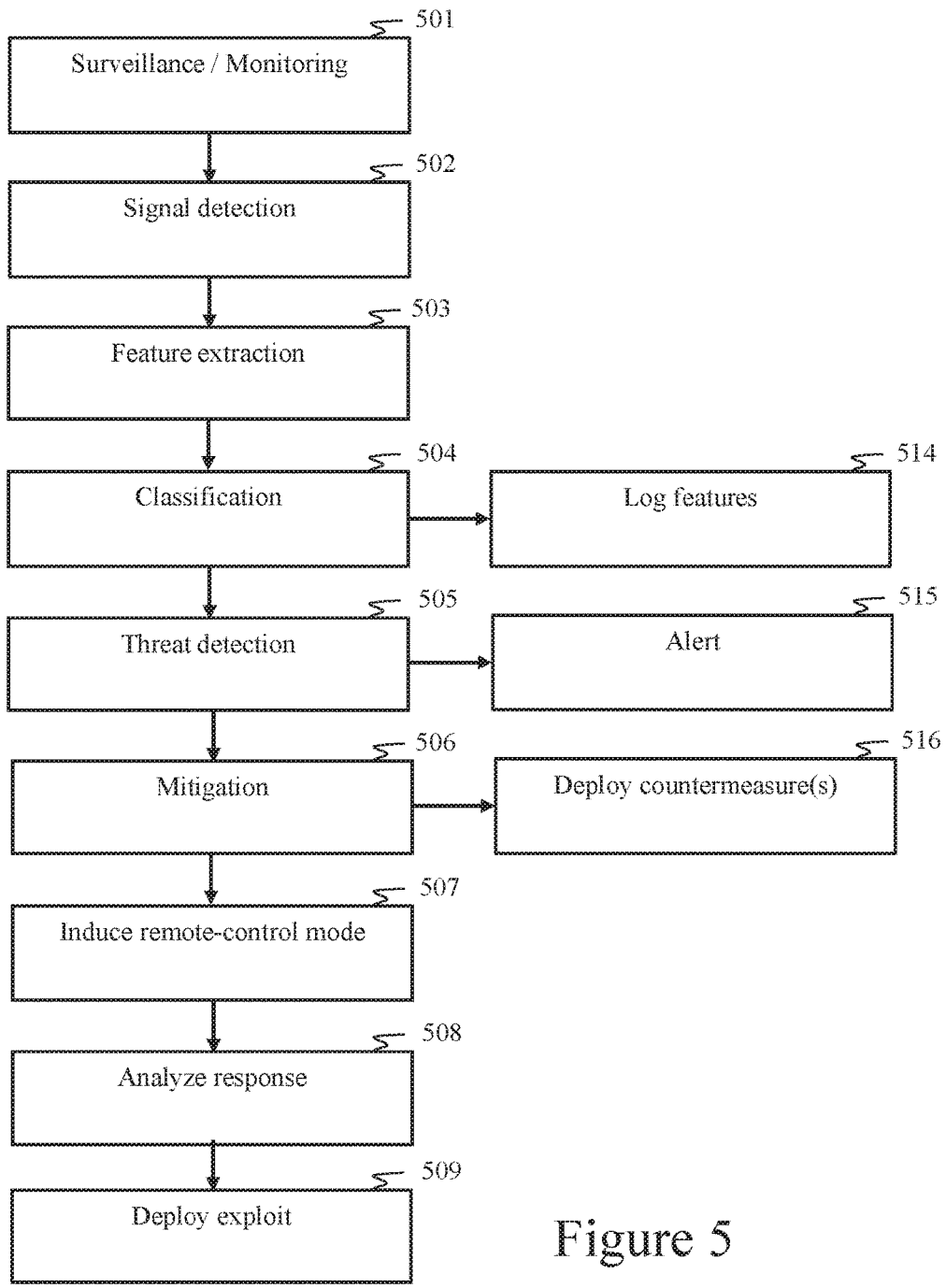
FIG. 5 is a flow diagram depicting a method of operating a threat detection and mitigation system in accordance with some aspects of the disclosure.

FIG. 5 is a flow diagram depicting a method of operating a threat detection and mitigation system in accordance with some aspects of the disclosure. Surveillance/monitoring 501 can be performed by a set of sensors and/or an antenna system that monitors the RF environment. Radio transmissions are detected, if possible, and the detected signals are characterized via feature extraction 503. The signal is classified 504 according to its features, if possible, to characterize its radio protocol, corresponding type of radio transceiver, and/or corresponding type of remote-controlled vehicle. The signal and/or its features can be logged 514. Threat detection 515 can comprise analyzing sensor data and/or the signal features to determine a threat. A decision process which determines a threat might trigger an alert 515, which may comprise a threat notification that is sent to the system user(s). Control proceeds to a mitigation step 506.

If the signal features can be used to identify the radio protocol, radio system type, and/or remote-controlled vehicle type (e.g., make, model, version), then a countermeasure corresponding to the radio protocol, radio system type, and/or remote-controlled vehicle type can be deployed 516. For example, if the signal of interest corresponds to a known transmission protocol, signal features and any meta data may be used to identify the device type of the target. If the device is a known type, then predetermined countermeasures corresponding to the device type can be selected and optionally deployed. For example, an exploit known to be effective against a UAV of a particular type can be selected. One of a set of exploits, ranging from interrupting a communication link, to hijacking control of the UAV, can be selected based on the nature of the threat and/or other criteria. In some aspects, a Physical-Layer protocol attack can be mounted, such as to facilitate another exploit.

If the transmission protocol is unknown, the signal features and possibly other sensor data are passed to a threat analyzer, which may determine the threat potential. If the target is perceived as a threat, the collected information is logged 514 and the system user(s) may be alerted 515. The features are employed for selecting countermeasures 506, 516 that are most likely to be effective against the threat. For example, the effectiveness of certain countermeasures, particularly Physical-Layer protocol attacks, are known to correlate with certain Physical-Layer features of a signal. If an attack is authorized, the countermeasures are employed 516. Otherwise, the system returns to its original RF monitoring state 501.

In DSSS and CDMA systems, effective countermeasures can comprise Physical-Layer protocol attacks directed to produce code-space contamination. Reference signals can take the form of spreading sequences, such as Golay codes, which are simple to contaminate. Such attacks can employ a Hamming-distance type of contamination that essentially correlates two or more code spaces, resulting in interference. In some aspects, since such reference signals are used for channel estimation and synchronization, full code-space pollution is not necessary to degrade the system. Rather, synthesized distortions that affect a smaller number (e.g., less than the Hamming distance) of the code chips might be necessary to achieve a desired effect.

In some aspects, signal detection might not reveal communications between the remote-controlled vehicle and a controller. For example, the remote-controlled vehicle might be in waypoint mode, autopilot mode, or may otherwise not be in a communication state. In such cases, mitigation mode 506 may activate an induce mode 507. In some aspects, sensor data for a target can be passed to the induce mode 507. In some aspects, features and/or device classifications from the sensor data can be passed to the induce mode 507. The induce mode 507 operates to establish radio communications with the target. In some aspects, this might be achieved via inducing the remote-controlled vehicle to change to a communication state, as would be used when the vehicle is under active radio control by a controller device. The induce mode 507 might transmit any of a variety of predetermined signals to elicit a response from the vehicle. Such transmissions may be selected based on information about the vehicle obtained based on the sensor data. In other aspects, the induce mode 507 may adapt transmissions, either randomly or deterministically. Step 507 can be performed as part of an iterative process, which further comprises analyzing responses 508 from the vehicle. Such responses might be detected radio transmissions and/or changes to the vehicle's navigation. The analyze response step 508 might comprise signal detection 502, feature extraction 503, and/or classification 504. Thus, in some aspects, upon detection of a radio response, control of the method may be routed to step 502, for example. In some aspects, upon detection and analysis of a response 508, a corresponding exploit might be deployed 509. In some instances, the exploit 509 might be a variation or adaptation of signals transmitted in the induce step 507.

Figure 6:
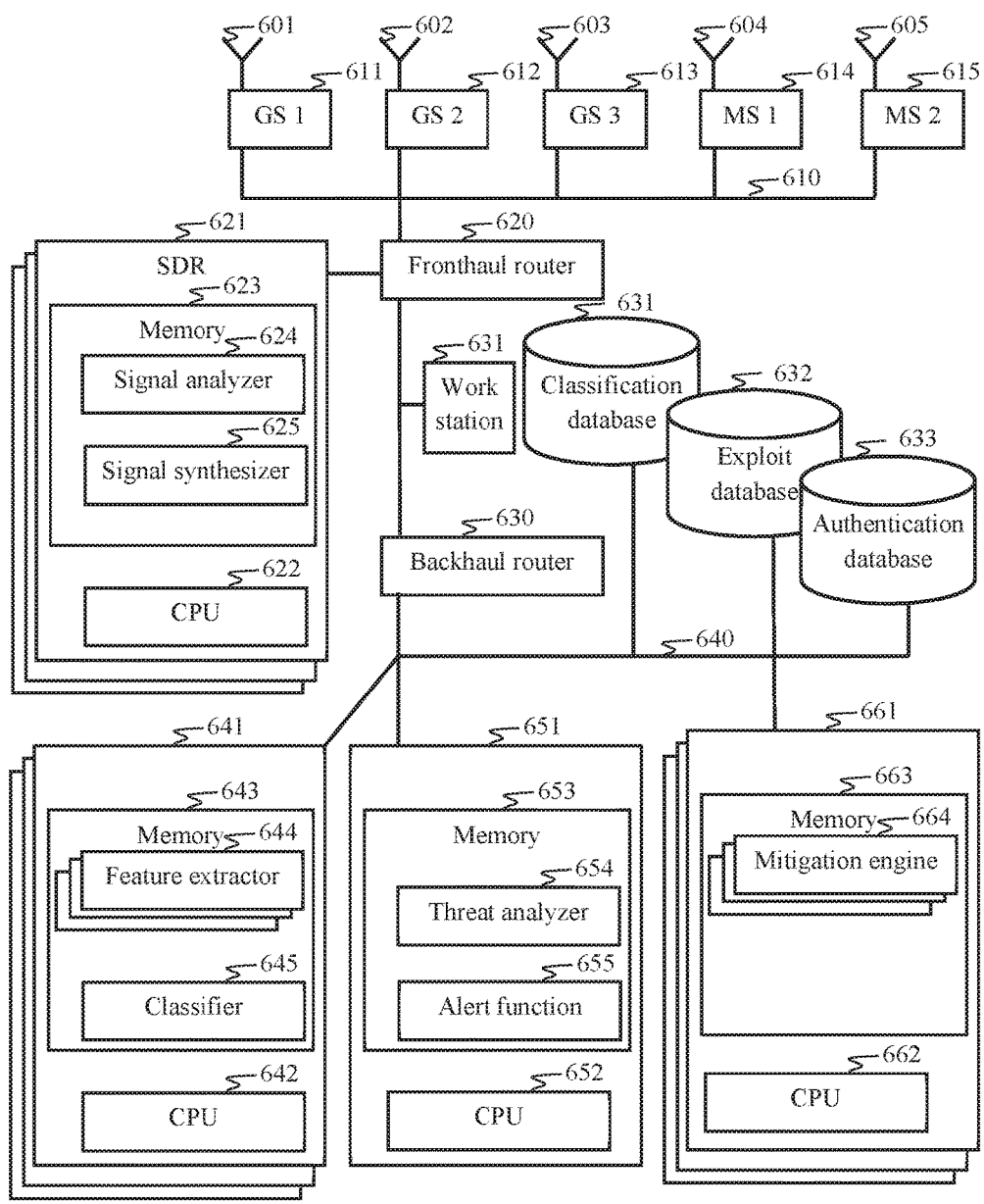
FIG. 6 depicts an exemplary distributed-computing network in accordance with aspects of the disclosure.

FIG. 6 depicts an exemplary distributed-computing network comprising a plurality of network nodes (e.g., 620, 630, 621, 641, 651, 661). Example network nodes can include switches, routers, hubs, access points, wireless devices, multi-homed servers, or other types of computing devices capable of routing network traffic. In some aspects, network nodes can include ground stations 611-613 and/or mobile stations 614-615. As shown herein, the network can span multiple networks, such as a fronthaul network 610 and a backhaul network 640. The network could include the Internet, satellite networks, and/or other networks. In some aspects, the network can encompass the entireties of other networks and/or portions thereof. The network can employ virtual networks, including (but not limited to) virtual private networks. In some aspects, the network can implement a file sharing network(s). The distributed network can provide resources (e.g., communication, storage, computation, etc.) for one or more of devices (e.g., workstation 631) and/or client applications (as is discussed below). The workstation 631 can be a tablet, a smart phone, or any type of thin client.

The distributive-computing network can serve users and client applications by providing on-demand real-time management of network resources (e.g., data, storage, communication, computation, and access to other network resources, such as antenna systems) by dynamically allocating the network resources. By way of example, a cloud computing platform can employ virtualization of storage and computing resources. Thus, a program running on the client work-station 631 can have physical resources (e.g., CPUs, memory, data depositories, communication equipment, etc.) residing on multiple devices distributed throughout the network. One exemplary program is a UAV detection, identification, and countermeasure program.

In one aspect, the distributed-computing network serves multiple devices (e.g., workstations). Accordingly, new resources can be provisioned for a client device by allocating an additional portion of shared resources to the client. In another aspect, the distributed-computing network serves multiple client applications, which may be different software programs or different concurrent running instances of the same program. Accordingly, new resources can be provisioned for a program by allocating an additional portion of shared resources to the program. Additionally, virtualization in cloud computing enables a network manager to dynamically multiplex resources among multiple clients (users and/or programs) without dedicating individual physical resources to each client.

One or more nodes in the network can serve as a network manager. A network manager can establish a communication topology among the network nodes. In some aspects, multiple nodes in the network can be configured to perform network management functions. For example, a network management role could pass from node to node. In some aspects, multiple nodes cooperate to perform network management. In some aspects, separate management roles are performed concurrently by different nodes. Hierarchical network management can be employed. In one aspect, router 620 is configured as a fronthaul network manager for the fronthaul network 610, and router 630 is configured as a backhaul network manager for the backhaul network 640. The network managers 620 and 640 might coordinate management functions, possibly via a negotiating process. Alternatively, one of the network managers 620 or 640 (or possibly another network node) might function as a global network manager, which can perform a global management role over multiple smaller networks or network portions.

In accordance with the disclosure and patents and patent applications that are incorporated by reference herein (including U.S. patent application Ser. Nos. 62/252,717 and 14/789,949), software-defined radio, virtualization of resources, network management, and other disclosed apparatus and method embodiments can be provided in the network shown in FIG. 6. In one aspect, a network manager can provision at least one communication topology corresponding to each software program and/or client device. For example, fronthaul router 620 functioning as a fronthaul network manager can provision a routing policy for a particular SDR (e.g., SDR 621) or SDR instance to communicate with one or more of the stations 611-615.

In one aspect, the fronthaul network manager 620 provisions a first routing topology corresponding to a first SDR 621 (or SDR instance) that comprises a first set of antennas selected from antenna systems 601-605. Manager 620 provisions a second routing topology corresponding to a second SDR 621 (or SDR instance) that comprises a second set of antennas selected from the antenna systems 601-605. The first set can differ from the second set. In such aspects, the routing topology can be adapted to select antennas 601-605 and/or stations 611-615 that best serve the function of the corresponding SDR 621. For example, antennas 601-605 can be selected to provide an omni-directional sensing mode for the SDR 621. Upon detection of a signal of interest, the routing topology might then be adapted to select stations 611-615 of corresponding antennas 601-605 that provide for directional sensing, and the routing topology might be further adapted to track a moving target of interest. The network manager 620 might provision a routing topology to select antennas 601-605 for use by the SDR 621 in an active attack.

In some aspects, the antenna systems 601-605 can comprise reconfigurable antennas, such as software-defined antennas, which can dynamically modify their frequency and/or radiation properties. Frequency reconfiguration is generally achieved by modifying physically or electrically the antenna dimensions using RF-switches, impedance loading, or tunable materials. Pattern reconfigurable antennas can employ movable/rotatable structures or include switchable and reactively-loaded parasitic elements. Pattern reconfigurable antennas can include adaptive antenna arrays, which can use spatial processing algorithms to detect transmission spatial signatures and calculate spatial weighting vectors to locate and track targets.

In one aspect, SDR 621 comprises a processor (CPU 622), which may be a multi-core processor, a memory 623 configured to store SDR programs (such as signal analyzer 624 and signal synthesizer 625 programs). Multiple signal processing functions are performed by general-purpose processors (e.g., CPUs 622) operable via software programs (e.g., programs 624 and 625) with instructions to perform signal-processing operations associated with threat detection, identification, and countermeasures. SDR 621 may comprise a full protocol stack of a radio protocol it is configured to process, or it may comprise a partial protocol stack and output data to be processed in other software programs, possibly residing on other nodes. In some aspects, SDR 621 resides on a network node, which can comprise physical ports (not shown). Functional aspects of the SDR 621, including network resources, might be distributed throughout the network, thus providing for a virtualized SDR. In some aspects, SDR 621 is one of a plurality of instances of an SDR program. Each SDR instance 621 might be configured for processing a different one of a plurality of radio protocols. Each SDR instance 621 might be configured for processing a different one of a plurality of targets or a different one of a plurality of different detected radio signals. Each SDR 621 can comprise a user interface that is operable on a client device, such as workstation 631. Each of the SDRs 621 might be configurable to communicate with a different client device(s).

In accordance with some aspects disclosed herein, the signal analyzer 624 comprises a spectrum analyzer program (which might include an FFT), a spectrum fragmenter (e.g., filtering) program, and/or a spatial processing program. Signal analyzer 624 can be configured to perform adaptive decoding. The signal analyzer 624 can include other programs, including, but not limited to, an equalizer program, a demultiplexing program, a demodulation program, as well as others. Signal synthesizer 625 can comprise a spatial processing program (such as to precode transmitted signals), a spreading program, a modulation program, a frequency-domain to time-domain converter program (e.g., an IFFT), a coding program, a data injection program, a frequency-shifting program, and/or an electromagnetic countermeasure attack generator program, as well as others.

In one aspect, the network comprises a software-based administrative entity (such as SDR 621, for example) which provides for network virtualization by combining hardware and software network resources and network functionality into a virtual network. Network virtualization can involve platform virtualization, often combined with resource virtualization.

Network virtualization can comprise external virtualization, combining many networks or parts of networks into a virtual unit, or internal virtualization, providing network-like functionality to software containers on a single network server. External network virtualization combines or subdivides one or more networks into virtual networks. A network manager can configure systems physically attached to the same local network into separate virtual networks. Conversely, an network manager can combine systems on separate networks into a single virtual network, the virtual network spanning segments of multiple networks.

In one aspect, a network manager provides software programs with access to database resources 631, 632, and 633. The network manager can provision resource topologies, such as database topologies as well as other topologies, for services running on the network. A resource topology can include a corresponding routing topology. The routing topology can be provisioned to achieve a predetermined set of performance metrics or an adaptable set of performance metrics, such as metrics relating to minimum data bandwidth, maximum latency, minimum quality of service, etc. Multiple routing topologies can be provisioned to according to global performance criteria, such as load balancing, energy efficiency, cost efficiency, etc.

In one aspect, one or more servers (such as servers 641) are provisioned for downstream signal processing from the SDR 621. Each server can comprise at least one processor 642, a memory 643, and one or more ports (not shown). The memory 643 can store signal-processing programs, such as feature extractor 644 and classifier 645 programs. In one aspect, a plurality of feature extractor programs 644 (or instances) can be provided wherein each program 644 is configured to process one of a plurality of data sets (or "events"). In some aspects, each of the extractor programs 644 processes one a plurality of feature types, such as modulation, pulse shape, management frame format, control frame format, data frame format, remote-control data, and the like. In some aspects, the classifer 645 might comprise a plurality of programs or subroutines configured to provide different classification functions. Such classification functions might include radio protocol identification, radio transceiver identification, UAV device identification, as well as others.

A server 651 comprises at least one processor 652 and a memory 653, which stores a threat analyzer program 654 and an alert function program 655. Threat analyzer 654 can include instructions to access classification database 631 and authentication database 633. The network manager 630 can provide a routing topology with sufficient bandwidth to enable the server 651 to access the databases 631 and 633, as well as communicate with other servers (e.g., servers 641 and 661). In some aspects, wherein processing is performed across multiple processing cores, the network manager 630 can provide a routing topology with sufficiently low latency for the processing operations. The alert function 655 can be configured to execute a set of operations upon detection of a threat by the threat analyzer 654, such as sending a notification to the workstation 631 and sending signal data to server 661, which is configured to perform mitigation.

Server 661 comprises at least one processor 662 and a memory 663, which stores a mitigation program 664. The mitigation program 664 might communicate with the exploit database 632, as well as other nodes in the network. In some aspects, the mitigation program 664 comprises a response analyzer program or subroutine (not shown) and an exploit adaptor program or subroutine (not shown). The response analyzer program might be configured to detect transmitted radio signals, extract features from the detected signals, and classify the signals, transceiver, and/or UAV. Thus, the response analyzer might employ other program elements in the network, such as the signal analyzer 624, the feature extractor 644, and the classifier 645. Furthermore, the response analyzer might update the classification database 631. Accordingly, the network manager 630 can provision a routing topology to enable the processing and communication requirements of the response analyzer. The exploit adaptor might be configured to employ the signal synthesizer 625 to generate an attack and may update the exploit database 632. The exploit adaptor might be configured to instruct the mobile stations (which can be airborne stations) to change heading, speed, altitude, and/or platform orientation to facilitate sensing and/or attacks. Accordingly, the network manager 630 can provision a routing topology to enable the processing and communication requirements of the exploit adaptor.

Distributed UAV detection, identification, and countermeasure systems have been disclosed herein. The specific network resources to be employed for each system function can be provisioned based on its location in the network, as well as its proximity to other network resources. The network resources can be provisioned with respect to each function's requirement(s), such as maximum tolerable latency, minimum data bandwidth, as well as others. For example, latency-sensitive operations can be performed close to the network edge. Operations requiring a large amount of processing and/or storage resources might be pooled in a central location, such as a data center farther from the edge, or widely distributed across multiple data centers, for example.

The various blocks shown in the figures can be viewed as method steps, and/or as operations that result from operation of computer program code, and/or as a plurality of coupled logic circuit elements constructed to carry out the associated function(s).

In general, the various exemplary aspects may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary aspects of the invention may be practiced in various components, such as integrated circuit chips and modules, and that the exemplary aspects may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry, and radio frequency circuitry that are configurable so as to operate in accordance with the exemplary aspects.

While aspects of the disclosure are directed toward UAVs, such aspects embodied in the systems and methods disclosed herein can be applied to other radio remote-controlled systems and devices, including, but not limited to unmanned nautical vehicles, unmanned terrestrial devices, sensor networks, home automation systems, supervisory control and data acquisition systems, and all types of robotic devices.

The invention claimed is:

1. An apparatus, comprising:
   a radio receiver coupled to at least one antenna and configured to detect radio signals communicated between a remote control unit and a remote-controlled vehicle;
   a feature extractor comprising at least one processor configured to extract signal features from detected radio signals;
   a classifier comprising at least one processor coupled to a classification database and configured to classify the detected radio signals based on the signal features and determine whether the detected radio signals correspond to a known or unknown radio protocol;

a threat analyzer comprising at least one processor configured to determine if a detected remote-controlled vehicle is a threat based on at least one of remote-sensing data and classification of the detected radio signals; and a mitigation engine comprising at least one processor configured to synthesize an exploit for a remote-control system that employs an unknown radio protocol based on corresponding extracted signal features.

2. The apparatus recited in claim 1, further comprising a response analyzer configured to detect a response from at least one of the remote-controlled vehicle and the remote control unit when an exploit is activated, update classification of the detected radio signals, and adapt the exploit based on the response.

3. The apparatus recited in claim 1, wherein the radio receiver is configured to measure a plurality of signal attributes from the detected radio signals, filter the detected radio signals based on the plurality of signal attributes, and couple filtered radio signals to the feature extractor.

4. The apparatus recited in claim 1, wherein the radio receiver comprises a Fourier transform and the detected radio signals comprise spectrum data produced by the Fourier transform, and a filter configured to select at least one portion of the spectrum data based on at least one filter criterion, the radio receiver configured to couple the at least one portion of the spectrum data to the feature extractor.

5. The apparatus recited in claim 1, wherein the feature extractor employs at least one of automatic modulation recognition and cyclostationary processing.

6. The apparatus recited in claim 1, wherein the threat detector is configured to evaluate detected radio signals to determine that at least one remote-controlled vehicle is a threat before the at least one remote-controlled vehicle is airborne.

7. The apparatus recited in claim 1, wherein the threat detector is configured to evaluate a target system's behavior to determine if it spoofed its authentication data.

8. The apparatus recited in claim 1, wherein the mitigation engine is configured to employ a protocol attack.

9. A non-transitory computer readable storage medium including processor-executable code for storing instructions operable to:

detect radio signals communicated between a remote control unit and a remote-controlled vehicle;

extract signal features from detected radio signals;

classify the detected radio signals based on the signal features and determine whether the detected radio signals correspond to a known or unknown radio protocol;

determine if a detected remote-controlled vehicle is a threat based on at least one of remote-sensing data and classification of the detected radio signals; and synthesize an exploit for a remote-control system that employs an unknown radio protocol based on corresponding extracted signal features.

10. The medium recited in claim 9, further comprising instructions operable to detect a response from at least one of the remote-controlled vehicle and the remote control unit when an exploit is activated, update classification of the detected radio signals, and adapt the exploit based on the response.

11. The medium recited in claim 9, further comprising instructions operable to measure a plurality of signal attributes from the detected radio signals, filter the detected radio signals based on the plurality of signal attributes, and couple filtered radio signals to a feature extractor.

12. The medium recited in claim 9, further comprising instructions operable to process the detected radio signals with a Fourier transform to provide detected radio signals comprising spectrum data produced by the Fourier transform, filter the spectrum data based on at least one filter criterion to produce at least one portion of the spectrum data, and couple the at least one portion of the spectrum data to a feature extractor.

13. The medium recited in claim 9, wherein extract signal features comprises at least one of automatic modulation recognition and cyclostationary processing.

14. The medium recited in claim 9, wherein determine if the detected remote-controlled vehicle is a threat comprises evaluating detected radio signals to determine that at least one remote-controlled vehicle is a threat before the at least one remote-controlled vehicle is airborne.

15. The medium recited in claim 9, wherein determine if the detected remote-controlled vehicle is a threat comprises evaluating a target system's behavior to determine if it spoofed its authentication data.

16. The medium recited in claim 9, wherein synthesize an exploit comprises employing a protocol attack.

17. A method, comprising:

detecting radio signals communicated between a remote control unit and a remote-controlled vehicle;

extracting signal features from detected radio signals;

classifying the detected radio signals based on the signal features to determine whether the detected radio signals correspond to a known or unknown radio protocol;

determining if a detected remote-controlled vehicle is a threat based on at least one of remote-sensing data and classification of the detected radio signals; and synthesizing an exploit for a remote-control system that employs an unknown radio protocol based on the signal features.

18. The method recited in claim 17, synthesizing comprises detecting a response from at least one of the remote-controlled vehicle and the remote control unit when an exploit is activated, updating classification of the detected radio signals, and adapting the exploit based on the response.

19. The method recited in claim 17, wherein detecting comprises measuring a plurality of signal attributes from the detected radio signals, filtering the detected radio signals based on the plurality of signal attributes, and coupling filtered radio signals to a feature extractor.

20. The method recited in claim 17, wherein the detecting comprises applying a Fourier transform such that the detected radio signals comprise spectrum data, selecting at least one portion of the spectrum data based on at least one filter criterion, and coupling the at least one portion of the spectrum data to the feature extractor.

21. The method recited in claim 17, wherein determining that at least one remote-controlled vehicle is a threat is based on at least one of the detected radio signal and additional sensor data.

22. The method recited in claim 17, wherein determining that at least one remote-controlled vehicle is a threat comprises evaluating a target system's behavior to determine if it spoofed authentication data.

* * * * *